United States Patent
Feng

(10) Patent No.: US 12,159,480 B2
(45) Date of Patent: Dec. 3, 2024

(54) METHOD AND APPARATUS FOR FINGERPRINT DATABASE CREATION, METHOD AND APPARATUS FOR FINGERPRINT DATABASE APPLICATION, CENTRALIZED PROCESSING DEVICE AND BASE STATION

(71) Applicant: ZTE CORPORATION, Guangdong (CN)

(72) Inventor: Hong Feng, Guangdong (CN)

(73) Assignee: ZTE CORPORATION, Shenzhen (CN)

(*) Notice: Subject to any disclaimer, the term of this patent is extended or adjusted under 35 U.S.C. 154(b) by 396 days.

(21) Appl. No.: 17/606,015

(22) PCT Filed: Mar. 24, 2020

(86) PCT No.: PCT/CN2020/080898
§ 371 (c)(1),
(2) Date: Oct. 22, 2021

(87) PCT Pub. No.: WO2020/215955
PCT Pub. Date: Oct. 29, 2020

(65) Prior Publication Data
US 2022/0198823 A1    Jun. 23, 2022

(30) Foreign Application Priority Data
Apr. 24, 2019    (CN) .......................... 201910336189.4

(51) Int. Cl.
*H04W 36/00*    (2009.01)
*G06V 40/12*    (2022.01)
*G06V 40/13*    (2022.01)

(52) U.S. Cl.
CPC .......... *G06V 40/1365* (2022.01); *G06V 40/13* (2022.01); *G06V 40/1347* (2022.01);
(Continued)

(58) Field of Classification Search
CPC .............. G06V 40/1365; G06V 40/13; G06V 40/1347; H04W 36/008375; H04W 36/00835
See application file for complete search history.

(56) References Cited

U.S. PATENT DOCUMENTS

| | | | |
|---|---|---|---|
| 11,844,041 B2* | 12/2023 | Qi | H04W 16/22 |
| 2012/0052835 A1* | 3/2012 | Bull | G01S 5/0278 |
| | | | 455/456.1 |

(Continued)

FOREIGN PATENT DOCUMENTS

| | | | | |
|---|---|---|---|---|
| CN | 103179658 A | * | 6/2013 | G01S 5/0252 |
| CN | 104704880 A | | 6/2015 | |

(Continued)

OTHER PUBLICATIONS

CN_108243451_A_Ma—English Translation (Year: 2018).*
(Continued)

*Primary Examiner* — Chi H Pham
*Assistant Examiner* — Weibin Huang
(74) *Attorney, Agent, or Firm* — MH2 TECHNOLOGY LAW GROUP LLP

(57) ABSTRACT

The present disclosure provides a method for radio frequency fingerprint database creation, a method for radio frequency fingerprint database application, a device, a centralized processing device and a base station. During creating a radio frequency fingerprint database, neighbor cell information statistics is performed on each of a plurality of neighbor cells of the cell in each of the plurality of divided grids, and an effective radio frequency fingerprint database corresponding to the cell is generated according to a result of the dividing and a result of the neighbor cell information statistics.

20 Claims, 9 Drawing Sheets

(52) U.S. Cl.
CPC ............. *H04W 36/00833* (2023.05); *H04W 36/008375* (2023.05)

(56) References Cited

U.S. PATENT DOCUMENTS

| | | | |
|---|---|---|---|
| 2013/0150054 A1 | 6/2013 | Axmon et al. | |
| 2013/0190011 A1* | 7/2013 | Kim .................... | H04W 64/00 455/456.1 |
| 2014/0094178 A1 | 4/2014 | Eskicioglu et al. | |
| 2015/0346317 A1 | 12/2015 | Patel et al. | |
| 2016/0192314 A1* | 6/2016 | Leppänen ............. | G01S 5/0278 455/456.1 |
| 2017/0094574 A1* | 3/2017 | Singh .................... | H04W 36/16 |
| 2021/0274387 A1* | 9/2021 | Kousaridas ........... | H04L 43/091 |

FOREIGN PATENT DOCUMENTS

| | | | |
|---|---|---|---|
| CN | 104754735 A | | 7/2015 |
| CN | 107920362 A | | 4/2018 |
| CN | 108243405 A | | 7/2018 |
| CN | 108243451 A | * 7/2018 | ........... G01S 5/0252 |
| CN | 108243495 A | | 7/2018 |
| WO | 2016183776 A1 | | 11/2016 |
| WO | 2020135450 A1 | | 7/2020 |

OTHER PUBLICATIONS

CN_103179658_A_Xiao—English Translation (Year: 2013).*
ZTE Corporation, International Search Report, PCT/CN2020/080898, Jun. 30, 2020, 5 pgs.
Ericsson et al., "On scenarios and assumptions for RFPM studies," 3GPP TSG-RAN WG4 Meeting #60AH, R4-115060, Oct. 14, 2011, 5 pgs.
ZTE Corporation, Extended European Search Report, EP 20796121. 0, May 13, 2022, 11pgs.
Chinese Notification of the Second Office Action dated Dec. 26, 2023 in corresponding Chinese Application No. 201910336189.4, translated, 15 pages.

* cited by examiner

| 0 | 1 | 1 | 1 | 1 |

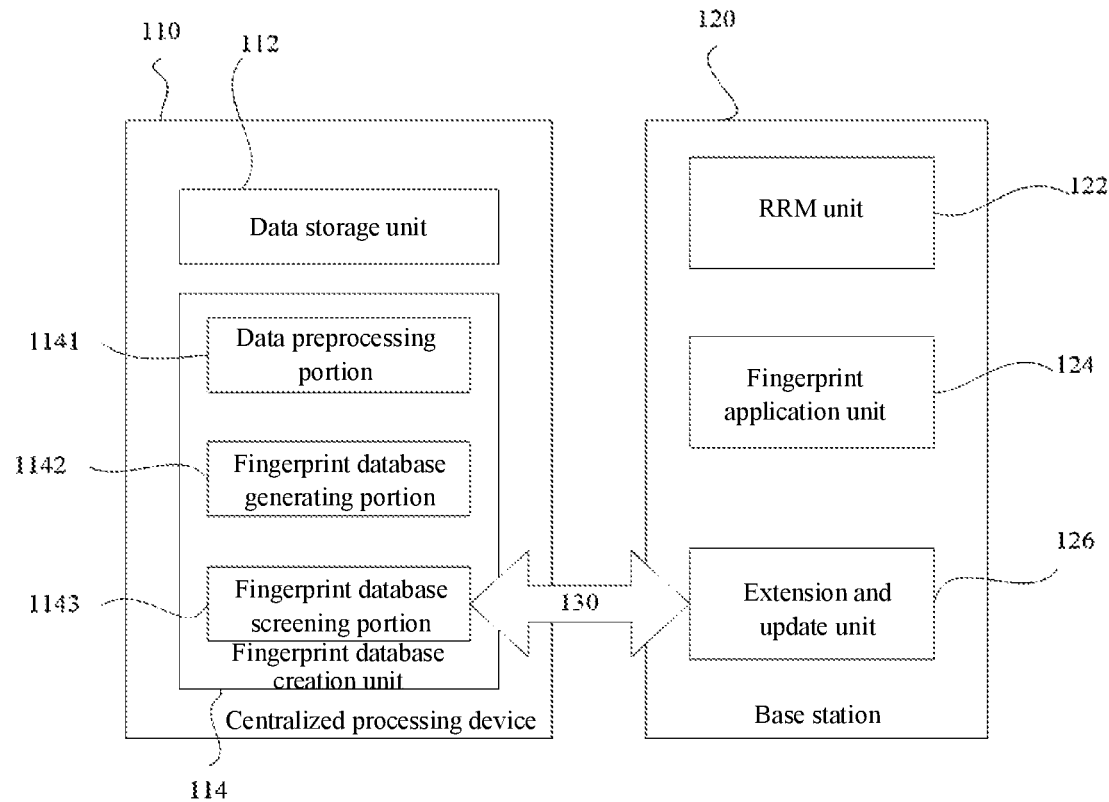

FIG. 14

| Serving cell identification | Cell-level quality of serving cell | Best beam identification of serving cell | Strongest intra-frequency neighbor cell identification | Cell-level quality of strongest intra-frequency neighbor cell | Second strongest intra-frequency neighbor cell identification | Cell-level quality of second strongest intra-frequency neighbor cell |

FIG. 15

METHOD AND APPARATUS FOR FINGERPRINT DATABASE CREATION, METHOD AND APPARATUS FOR FINGERPRINT DATABASE APPLICATION, CENTRALIZED PROCESSING DEVICE AND BASE STATION

CROSS REFERENCE TO RELATED APPLICATIONS

The present disclosure is a United States National Stage Application filed under 35 U.S.C. § 371 of PCT Patent Application Serial No. PCT/CN2020/080898, filed Mar. 24, 2020, which claims the priority of Chinese patent application No. 201910336189.4, entitled "METHOD AND APPARATUS FOR FINGERPRINT DATABASE CREATION, METHOD AND APPARATUS FOR FINGERPRINT DATABASE APPLICATION, CENTRALIZED PROCESSING DEVICE AND BASE STATION," filed Apr. 24, 2019, which is incorporated by reference in its entirety.

TECHNICAL FIELD

The present disclosure relates to the field of communication technologies, in particular to a method and apparatus for fingerprint database creation, a method and apparatus for fingerprint database application, a centralized processing device and a base station.

BACKGROUND

In a conventional wireless network, network resource management functions are all based on a granularity of cells for processing. However, with the increase of complexity of a wireless environment and improvement of requirements on the user's communication experience, the processing based on the cell granularity is unable to realize some more refined requirements on network optimization or performance improvement. Therefore, processing based on a granularity of grids emerges as the times require. The processing based on the granularity of grids is that a coverage area of a serving cell where a terminal located is logically divided into a plurality of signal grids according to a cell measurement result reported by the terminal, so as to perform differentiated processing on different grids in the cell.

However, in related technologies, information in a radio frequency fingerprint database (i.e., a grid database) is relatively general and deficient, usually only the number of inter-system handover attempts and successes at a grid level is recorded, which may greatly affect an application range of the radio frequency fingerprint database and reduce an application effect of the radio frequency fingerprint database.

SUMMARY

Embodiments of the present disclosure provide a method and apparatus for fingerprint database creation, a method and apparatus for fingerprint database application, a centralized processing device and a base station, which are intended to provide a solution for radio frequency fingerprint database creation and application, so as to solve a problem of affecting an application range and application effect of the radio frequency fingerprint database due to only recording the number of inter-system handover attempts and successes at a grid level.

In order to solve the above problem, embodiments of the present disclosure provide a method for radio frequency fingerprint database creation, including: dividing a cell into a plurality of grids according to a plurality of grid indexes and historical data reported by each of a plurality of terminals in the cell, wherein one grid index is used to uniquely identify one grid; performing neighbor cell information statistics on each of a plurality of neighbor cells of the cell in each of the plurality of grids; and generating an effective radio frequency fingerprint database corresponding to the cell according to a result of the dividing and a result of the neighbor cell information statistics.

Embodiments of the present disclosure further provide a method for radio frequency fingerprint database application, including: acquiring an effective radio frequency fingerprint database created by a centralized processing device, wherein the effective radio frequency fingerprint database is created according to the method for radio frequency fingerprint database creation according to the above method for radio frequency fingerprint database creation; and applying the effective radio frequency fingerprint database to perform radio resource management RRM on a plurality of terminals.

Embodiments of the present disclosure further provide an apparatus for radio frequency fingerprint database creation, including: a dividing module, configured to divide a cell into a plurality of grids according to a plurality of grid indexes and historical data reported by each of a plurality of terminals in the cell, wherein one grid index is used to uniquely identify one grid; a statistics module, configured to perform neighbor cell information statistics on each of a plurality of neighbor cells of the cell in each of the plurality of grids; and a generating module, configured to generate an effective radio frequency fingerprint database corresponding to the cell according to a result of the dividing and a result of the neighbor cell information statistics.

Embodiments of the present disclosure further provide an apparatus for radio frequency fingerprint database application, including: an acquiring module, configured to acquire an effective radio frequency fingerprint database created by a centralized processing device, wherein the effective radio frequency fingerprint database is created according to the method for radio frequency fingerprint database creation according to the above method for radio frequency fingerprint database creation; and an applying module, configured to apply the effective radio frequency fingerprint database to perform radio resource management RRM on a plurality of terminals.

Embodiments of the present disclosure further provide a centralized processing device, including: a first processor, a first memory and a first communication bus; wherein the first communication bus is configured to realize communication connection between the first processor and the first memory; and the first processor is configured to execute one or more programs stored in the first memory to perform steps in the method for radio frequency fingerprint database creation.

Embodiments of the present disclosure further provide a base station, including: a second processor, a second memory and a second communication bus; wherein the second communication bus is configured to realize communication connection between the second processor and the second memory; and the second processor is configured to execute one or more programs stored in the second memory to perform steps in the method for radio frequency fingerprint database creation.

Embodiments of the present disclosure further provide a communication system, including: the centralized processing device and at least one base station, wherein the centralized processing device is communicatively coupled to the at least one base station.\

Embodiments of the present disclosure further provide a storage medium at least storing one or both of a radio frequency fingerprint database creation program and a radio frequency fingerprint database application program, wherein the radio frequency fingerprint database creation program is executable by one or more processors to perform steps in the method for radio frequency fingerprint database creation, and the radio frequency fingerprint database application program is executable by one or more processors to perform steps in the method for radio frequency fingerprint database application.

Additional features and corresponding beneficial effects of the present disclosure are described later part of the description, and it should be understood that at least some of the beneficial effects may become apparent from the description of the present disclosure.

BRIEF DESCRIPTION OF THE DRAWINGS

FIG. 14 is an architectural diagram of the communication system provided in FIG. 13; and FIG. 15 is a schematic structural diagram of a grid index provided in Embodiment 6 of the present disclosure.

DETAILED DESCRIPTION

Figure 1:
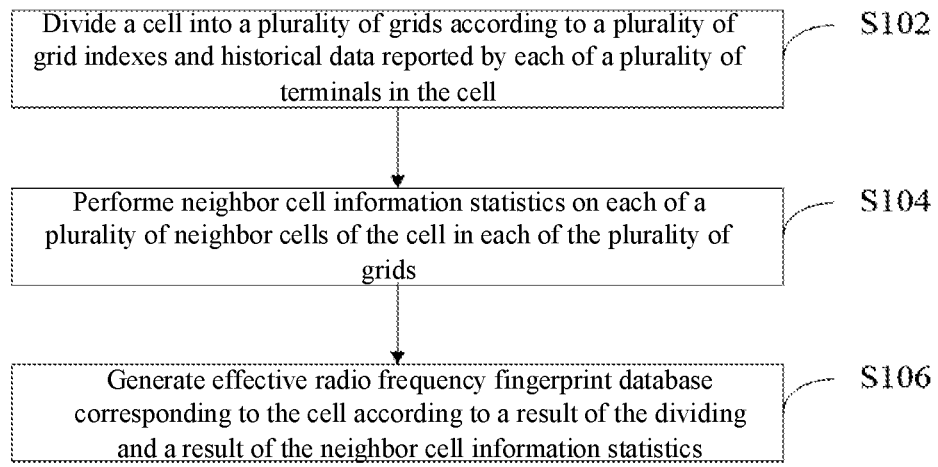
FIG. 1 is a flowchart of a method for radio frequency fingerprint database creation provided in Embodiment 1 of the present disclosure.

In order to make the objectives, technical solutions and advantages of the present disclosure clearer, embodiments of the present disclosure are described in details through specific embodiments with reference to the accompanying drawings. It should be understood that the specific embodiments described herein are merely intended to explain the present disclosure and are not intended to limit the present disclosure.

Embodiment 1

Only the number of inter-system handover attempts and the number of inter-system handover successes at a grid level are recorded in related technologies, which causes a base station to determine a success rate of inter-system handover for a terminal in a certain grid only based on a radio frequency fingerprint database when the base station performs radio resource management by using the radio frequency fingerprint database, and then to determine whether to perform the inter-system handover for the certain terminal based on the handover success rate at most. That is, how to perform the handover is unable to be determined, such as to which neighbor cell to handover, and more detailed management issues.

In order to solve the problem that grid information in the radio frequency fingerprint database is general and the radio frequency fingerprint database is limited in a radio resource management application in related technologies, this embodiment provides a method for radio frequency fingerprint database creation. The advantageous effects of the present disclosure are described in the following. According to a method and apparatus for fingerprint database creation, a method and apparatus for fingerprint database application, a centralized processing device and a base station provided in the embodiments of the present disclosure, during the radio frequency fingerprint database creation, a cell is first divided into a plurality of grids according to a plurality of grid indexes and historical data reported by each of a plurality of terminals in the cell, and one grid index is used to uniquely identify one grid. Neighbor cell information statistics is then performed on each of a plurality of neighbor cells of the cell in each of the plurality of grids, and an effective radio frequency fingerprint database corresponding to the cell is generated according to a result of the dividing and a result of the neighbor cell information statistics. During the radio frequency fingerprint database application, an effective radio frequency fingerprint database created by a centralized processing device is acquired first, and then the effective radio frequency fingerprint database is applied to perform radio resource management (RRM) on a plurality of terminals. In the radio frequency fingerprint database created in the embodiment of the present disclosure, statistics is respectively performed on neighbor cell information of each neighbor cell in each grid, so that relevant information of each grid in the effective radio frequency fingerprint database is enriched and refined, thereby reflecting the relationship between the grid and each neighbor cell in the radio frequency fingerprint database. Therefore, during the application, the base station may directly perform the RRM on a terminal in a certain grid according to the neighbor cell information of the certain grid in the effective radio frequency fingerprint database, thereby improving the role of the effective radio frequency fingerprint database in the radio resource management on the terminal and facilitating effect of the radio resource management based on the radio frequency fingerprint database.

Referring to a flowchart of a method for radio frequency fingerprint database creation shown in FIG. 1.

In step 102, a cell is divided into a plurality of grids according to a plurality of grid indexes and historical data reported by each of a plurality of terminals in the cell.

There are usually a plurality of terminals in one cell, which may have different wireless communication characteristics due to different signal coverage on the cell (e.g., different detected signal strengths, different cases of receiving neighbor cell signals, etc.). In order to facilitate more precise radio resource management, a cell may be further divided so that terminals having similar radio communication characteristics are divided into the same category, thereby performing similar network resource management on terminals within the same category. This category is called as "grid", and it should be understood that the grid does not simply divide a cell from a geographic location, but logically divides the cell based on the wireless communication characteristic of each terminal within the cell.

A grid index is the information able to uniquely identify a grid, and is also a basis for logically dividing a cell to form a plurality of grids. Briefly, the grid index determines how to classify each terminal in the cell. The grid index includes two or more specified wireless communication characteristics, so that terminals having the same grid index or terminals having the same specified wireless communication characteristic may be grouped into a grid corresponding to the grid index.

Figure 2:
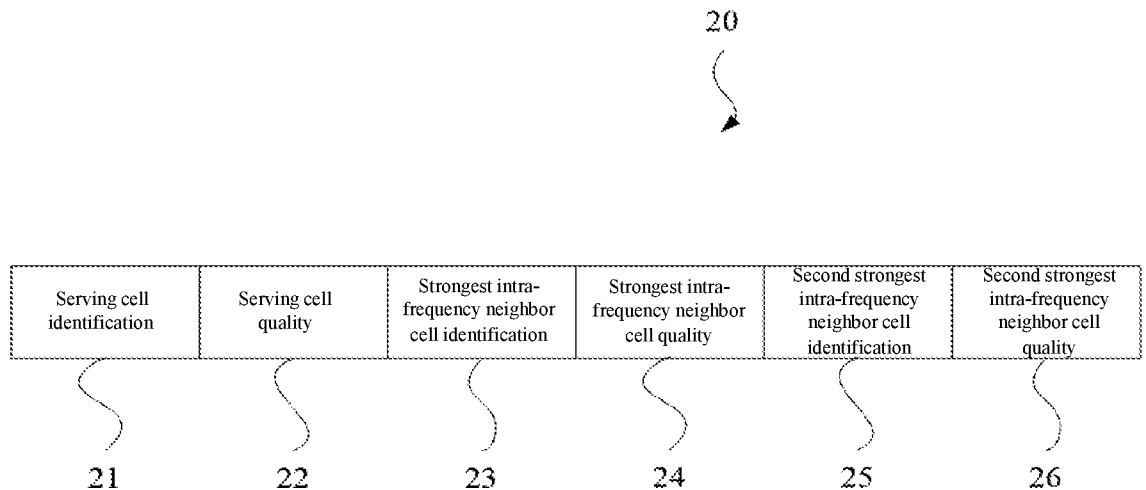
FIG. 2 is a schematic structural diagram of a grid index provided in Embodiment 1 of the present disclosure.

The above wireless communication characteristics may include a serving cell identification, serving cell quality, a strongest intra-frequency neighbor cell identification, strongest intra-frequency neighbor cell quality, a second strongest intra-frequency neighbor cell identification and second strongest intra-frequency neighbor cell quality. In an example of this embodiment, as shown in FIG. 2, the grid index 20 includes all the above six wireless communication characteristics. The serving cell identification 21 refers to a cell identification of a current serving cell of the terminal, the serving cell quality 22 refers to signal quality of the serving cell detected by the terminal, the strongest intra-frequency neighbor cell identification 23 refers to an identification of an intra-frequency neighbor cell having the strongest signal detected by the terminal, the strongest intra-frequency neighbor cell quality 24 refers to signal quality of the intra-frequency neighbor cell having the strongest signal detected by the terminal, the second strongest intra-frequency neighbor cell identification 25 refers to an identification of an intra-frequency neighbor cell having the second strongest signal detected by the terminal, and the second strongest intra-frequency neighbor cell quality 26 refers to signal quality of the intra-frequency neighbor cell having the second strongest signal detected by the terminal.

It should be understood that, in other examples of this embodiment, the grid index may include only the serving cell identification, the serving cell quality, the strongest intra-frequency neighbor cell identification and the strongest intra-frequency neighbor cell quality.

In the related technologies, the base station creates the radio frequency fingerprint database based on intra-frequency measurement reports (MR) reported by each terminal in real time and statistics results of long term evolution (LTE) inter-system handover. That is, the base station updates the information in the radio frequency fingerprint database according to the latest reported information of the terminal after the terminal reports its own information. It should be understood that a large amount of data is required to create the radio frequency fingerprint database. Therefore, in the radio frequency fingerprint database creation scheme of the related technology, the base station takes a long time from starting to create the radio frequency fingerprint database, that is, to obtain a first intra-frequency MR and determining the statistics results of the LTE inter-system handover for the first time to truly create the radio frequency fingerprint database for application. In this period of time, the base station continuously accumulates the relevant information of the terminal until enough information is accumulated to complete the creation of the radio frequency fingerprint database.

However, in some examples of this embodiment, historical data reported by the terminal may be collected and acquired before creating the radio frequency fingerprint database, so that the radio frequency fingerprint database may be created directly based on the historical data. In some examples, the historical data includes MRs and handover (HO) information. The HO information represents a handover situation of the terminal, such as the number of handover attempts and the number of handover successes. In one example of this embodiment, the radio frequency fingerprint database is created based on a preset number of MRs and a preset number of HO information recently reported by each terminal. For example, assuming that at least N0 MRs and N0 HO information are required to create the radio frequency fingerprint database, the historical data which is pre-acquired are N0 MRs and N0 HO information recently reported by each terminal. In another example of this embodiment, the radio frequency fingerprint database is created based on the MRs and HO information reported by each terminal in a latest preset period of time. In this case, the number of the MRs and the number of the HO information are uncertain when creating the radio frequency fingerprint database. For example, the MRs and HO information reported by each terminal in a time period T0 from a current time may be acquired as the historical data for creating the radio frequency fingerprint database.

MR information may include an intra-frequency MR and one or both of an inter-frequency MR and an inter-system MR, and the HO information may include one or both of an inter-frequency HO and an inter-system HO. In one example of this embodiment, the MR information includes three of the following: the intra-frequency MR, the inter-frequency MR and inter-system MR, and the HO information also includes both the inter-frequency HO and the inter-system HO. Therefore, for a terminal, the intra-frequency MR, the inter-frequency MR, the inter-system MR, the inter-frequency HO and the inter-system HO successively reported by the terminal may be received.

The so-called "inter-system," as its name implies, refers to different systems, i.e., communication systems of different standards, such as a global system for mobile communication (GSM) is inter-system relative to time division-synchronous code division multiple access (TD-SCDMA), or LTE is inter-system relative to wideband code division multiple access (WCDMA).

Figure 3:
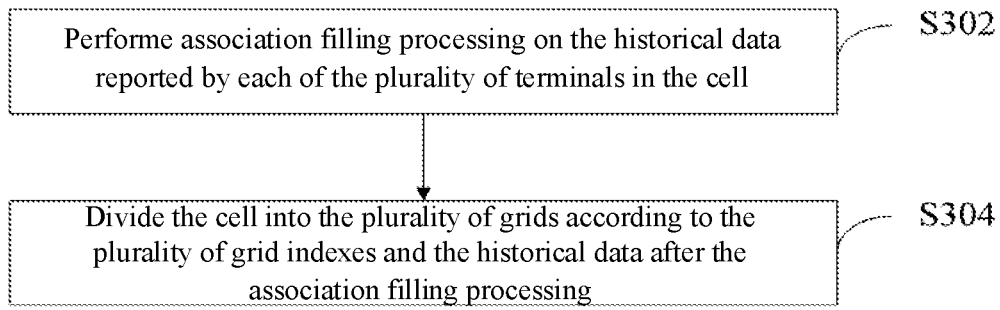
FIG. 3 is a flowchart of grid division provided in Embodiment 1 of the present disclosure.

After the historical data for creating the radio frequency fingerprint database is obtained, grid division may be implemented with reference to the flowchart shown in FIG. 3.

In step 302, association filling processing is performed on the historical data reported by each of the plurality of terminals in the cell.

In this embodiment, the MRs and the HO information successively reported by the same terminal may be associated. For example, it is assumed that the intra-frequency MR, inter-frequency MR, inter-system MR, inter-frequency HO and inter-system HO is needed for creating the radio frequency fingerprint database, the intra-frequency MR, inter-frequency MR and inter-system MR successively reported by one of the terminals may be associated first during associating the historical data to be sorted out as one piece of MR information. Then the inter-frequency HO and inter-system HO reported by the terminal successively are associated with the MR information of the terminal.

As described above, in some examples, the grid index includes information of the strongest intra-frequency neighbor cell (the strongest intra-frequency neighbor cell identification and the strongest intra-frequency neighbor cell quality) and information of the second strongest intra-frequency neighbor cell (the second strongest intra-frequency neighbor cell identification and the second strongest intra-frequency neighbor cell quality). In these cases, in order to determine the grid index of the grid to which the terminal belongs, it should be ensured that there is information of at least two intra-frequency neighbor cells in the intra-frequency MR of the terminal. Otherwise, it may be inconvenient for the grid division of the terminal. Similarly, if the grid index includes information of M intra-frequency neighbor cells, information of at least M intra-frequency neighbor cells needs to be included in the intra-frequency MR of the terminal. For example, if information of a third strongest intra-frequency neighbor cell in addition to the information of the strongest intra-frequency neighbor cell and the second strongest intra-frequency neighbor cell is included in the grid index, M is equal to 3 and information of at least three intra-frequency neighbor cells needs to be included in the intra-frequency MR reported by the terminal.

For historical data in which the number of intra-frequency neighbor cells is less than M, the historical data may be filled so that the historical data includes the information of M intra-frequency neighbor cells, thereby realizing the division of the grid to which the terminal belongs subsequently according to the grid index. It should be understood that the historical data is filled according to preset filling rules, and generally, this kind of historical data is not filled very well. For example, assuming that the intra-frequency MR reported by a terminal includes information of only one intra-frequency neighbor cell, but the grid index requires each intra-frequency MR to include information of at least two intra-frequency neighbor cells. Therefore, a real neighbor cell identification may not be filled in the intra-frequency MR when filling data of another intra-frequency neighbor cell in the intra-frequency MR, and meanwhile, only a low signal quality value (usually the worst quality value) is filled into the intra-frequency neighbor cell, thereby avoiding the case where the filling data affects an actual grid division result.

In step 304, the cell is divided into the plurality of grids according to the plurality of grid indexes and the historical data after the association filling processing.

After the association filling processing is performed on the historical data of the terminals in the cell, the cell may be divided into the plurality of grids according to the grid indexes and the history data after the association filling processing. Assuming that a grid index format is shown in FIG. 2, two terminals belong to the same grid when the serving cell identification, serving cell quality, strongest intra-frequency neighbor cell identification, strongest intra-frequency neighbor cell quality, second strongest intra-frequency neighbor cell identification and second strongest intra-frequency neighbor cell quality of the two terminals are the same. It should be understood that, for the "serving cell quality," "strongest intra-frequency neighbor cell quality" and "second strongest intra-frequency neighbor cell quality" of each terminal, values thereof may not be required to be completely the same, and "the same" herein means that these wireless communication characteristics belong to the same interval range.

In step 104, neighbor cell information statistics is performed on each of a plurality of neighbor cells of the cell in each of the plurality of grids.

After the cell is divided into grids and the terminals included in each grid are determined, statistics may be performed on the neighbor cell information of each neighbor cell in each grid. For example, for a grid 1 and a grid 2 in a cell A, statistics may be performed on neighbor cell information of each neighbor cell of the cell A in the grid 1 and neighbor cell information of each neighbor cell of the cell A in the grid 2. Generally, the neighbor cell information of a certain neighbor cell collected in a grid may represent at least one of the following: neighbor cell quality of the neighbor cell measured in the grid, an overlapping coverage degree of the neighbor cell in the grid, a handover success rate of handover of a terminal to the neighbor cell in the grid.

In some examples, the number of MRs participating in the construction of each grid may be counted first for the each grid. Then, statistics may be performed on the following information for each neighbor cell of the cell in each grid: a neighbor cell quality average value, a number of reporting times of neighbor cell quality being greater than a first threshold, a number of neighbor cell reporting times, and a number of handover attempts and a number of handover successes for each neighbor cell.

It should be understood that the "neighbor cell quality of the neighbor cell measured in the grid" may be represented by the neighbor cell quality average value, the overlapping coverage degree may be represented by a ratio of the number of the reporting times of the neighbor cell quality being greater than the first threshold to the number of MRs participating in the construction of the grid, and the handover success rate of handover of the terminal to the neighbor cell in the grid may be determined by a ratio of the number of handover successes to the number of handover attempts. Therefore, in one example of this embodiment, the neighbor cell information may include the neighbor cell quality, overlapping coverage degree and handover success rate.

In some examples of this embodiment, during performing neighbor cell information statistics, in addition to the neighbor cell quality average value, at least one of several kinds of information such as a neighbor cell quality variance and a reporting ratio of each quality interval may be recorded.

In step 106, an effective radio frequency fingerprint database corresponding to the cell is generated according to a result of the dividing and a result of the neighbor cell information statistics.

After completing the grid division of the cell and the statistics of the neighbor cell information, the effective radio frequency fingerprint database corresponding to the cell may be generated according to the result of the dividing and the result of the neighbor cell information statistics.

In related technologies, the radio frequency fingerprint database is created and applied by the base station, but the processing capability of the base station is very limited. Processing resources required to create the radio frequency fingerprint database may affect processing on other communication services by the base station to some extent. In order to solve this problem, in the method for the radio frequency fingerprint database creation provided in this embodiment, the creation of the radio frequency fingerprint database may not be implemented by the base station and the effective radio frequency fingerprint database may be created by the centralized processing device. Then the centralized processing device sends the effective radio frequency fingerprint database to the base station after the effective radio frequency fingerprint database is created, so that the base station may realize the application of the radio frequency fingerprint database. In this way, the processing resources occupied by the base station to create the radio frequency fingerprint database are reduced, so that the base station has more processing resources applied to the processing on the communication service of each terminal, thereby optimizing resource configuration.

In this embodiment, the centralized processing device may be a device in which a centralized processing unit is deployed, such as a network management device, a network management system, a big data platform, a cloud platform, mobile edge computing (MEC), or the like. These devices may perform batch processing on recently existing sufficient historical data to generate the radio frequency fingerprint database when creating the radio frequency fingerprint database.

Figure 4:
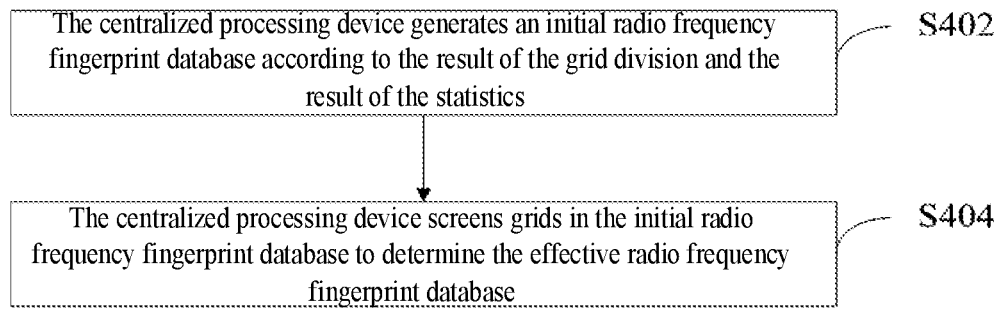
FIG. 4 is a flowchart of creating an effective radio frequency fingerprint database provided in Embodiment 1 of the present disclosure.

Meanwhile, the storage capacity of the base station is very limited, which may limit the number of stored grids and the information corresponding to the grids, thereby directly affecting fineness of the grids and a range of the grid application. In order to improve a proportion of the effective grids, the base station may only update the grid iteratively according to intra-frequency measurement results reported by the terminal in real time. However, a converge speed of this kind of approach is slow which may affect the grid application effect. Therefore, in this embodiment, in order to increase the proportion of the effective grids in the radio frequency fingerprint database which are sent to the base station, the centralized processing device may create the effective radio frequency fingerprint database with reference to the flowchart shown in FIG. 4.

In step 402, the centralized processing device generates an initial radio frequency fingerprint database according to the result of the grid division and the result of the neighbor cell information statistics.

In some examples of this embodiment, the centralized processing device may generate the radio frequency fingerprint database according to the result of the grid division and the result of the neighbor cell information statistics after implementing the grid division according to the grid indexes and the historical data and performing neighbor cell information statistics on each grid. The radio frequency fingerprint database does not undergo screening, and thus the proportion of the effective grids is not high. Therefore, if the radio frequency fingerprint database is directly sent to the base station, not only a large number of storage resources of the base station are occupied, but also the effect of the radio resource management of the radio frequency fingerprint database is affected because the proportion of the effective grids in the radio frequency fingerprint database is not high. Therefore, the centralized processing device generally may not send the radio frequency fingerprint database to the base station. In order to separate the radio frequency fingerprint database from a radio frequency fingerprint database last sent to the base station, the radio frequency fingerprint database here is referred to as the "initial radio frequency fingerprint database."

In step 404, the centralized processing device screens grids in the initial radio frequency fingerprint database to determine the effective radio frequency fingerprint database.

After generating the initial radio frequency fingerprint database, the centralized processing device screens the grids in the initial radio frequency fingerprint database. Through the screening, the grids with low effectiveness are screened out, and then the "effective radio frequency fingerprint database" that is finally transmitted to the base station is obtained.

Figure 5:
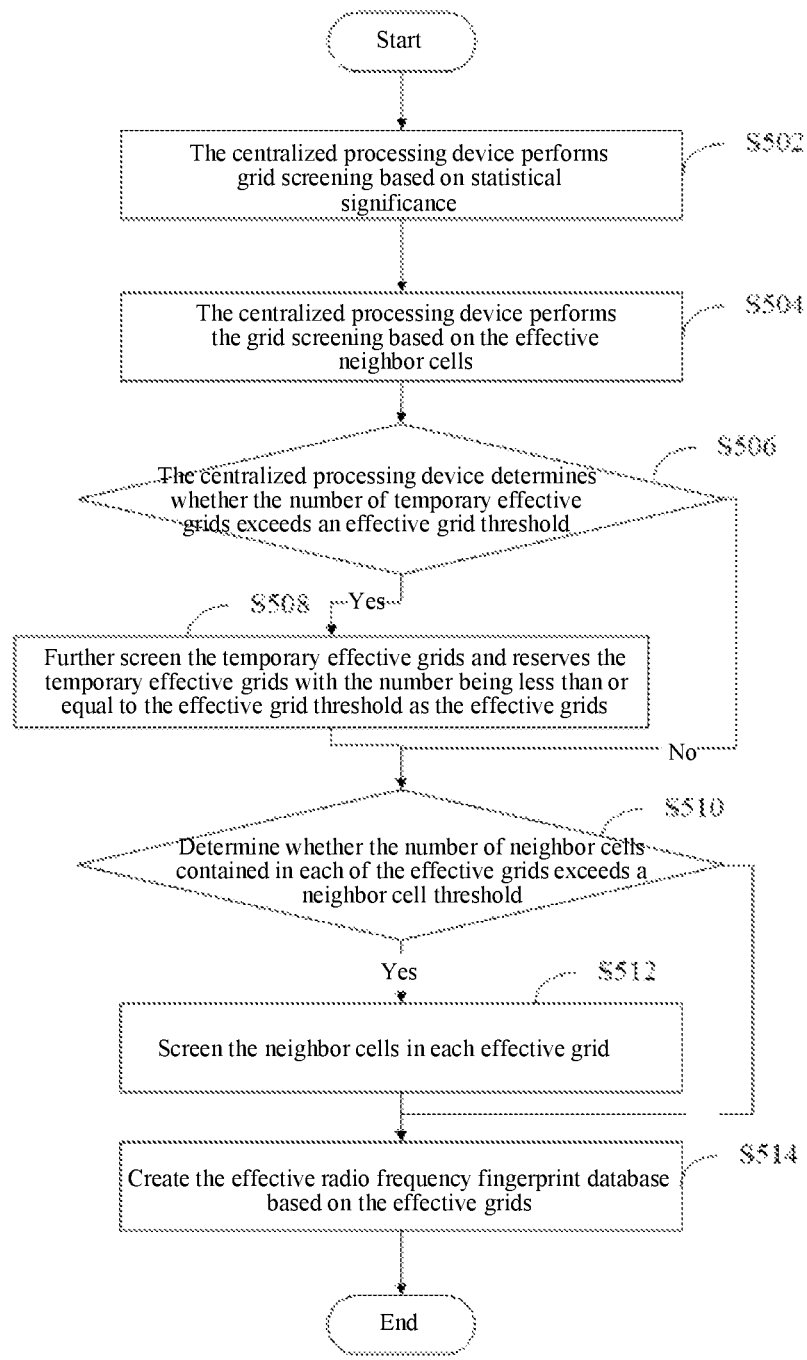
FIG. 5 is a flowchart of grid screening provided in Embodiment 1 of the present disclosure.

In some examples of this embodiment, as shown in FIG. 5, the centralized processing device may screen the grids to determine the effective radio frequency fingerprint database in the following manner.

In step 502, the centralized processing device performs grid screening based on statistical significance.

First, the centralized processing device may perform the screening based on the statistical significance. That is, grids whose number of MRs participating in grid construction is less than a construction threshold in the initial radio frequency fingerprint database are screened out and neighbor cells whose number of neighbor cell reporting times is less than a reporting threshold in the initial radio frequency fingerprint database are screened out. Because division of a grid may have no statistical significance and the effectiveness of the grid may be very low if the construction of the grid is not based on sufficient MRs. And if the reporting times of a neighbor cell is insufficient, the neighbor cell information of the neighbor cell also has no statistical significance.

In some examples, the screening based on the statistical significance may also be performed in consideration of at least one of the number of handover attempts, the number of handover successes, and the like based on the neighbor cell.

In step 504, the centralized processing device performs the grid screening based on the effective neighbor cells.

In some examples of this embodiment, the centralized processing device may also screen the neighbor effectiveness after the screening based on the statistical significance. For example, in one example, the centralized processing device may select neighbor cells of which neighbor cell quality average values, overlapping coverage degrees and handover success rates are respectively greater than each respective corresponding threshold as the effective neighbor cells. Meanwhile, the centralized processing device uses a grid including at least one effective neighbor cell as a temporary effective grid. Of course, in some examples, the centralized processing device may make comprehensive decision, instead of independent decision, on such factors as the neighbor cell quality average value, the overlapping coverage degree and the handover success rate when performing neighbor cell effectiveness screening.

In step 506, the centralized processing device determines whether the number of temporary effective grids exceeds an effective grid threshold.

If the number of temporary effective grids exceeds the effective grid threshold, the process proceeds to step 508. If the number of temporary effective grids does not exceed the effective grid threshold, the centralized processing device may directly take these temporary effective grids as the effective grids and proceeds to step 510.

The centralized processing device may also determine whether a current number of temporary effective grids exceeds the effective grid threshold after performing the statistical significance screening and the neighbor cell effectiveness screening, and the centralized processing device may directly take the temporary effective grids as the effective grids if it is determined that the number of temporary effective grids does not exceed the effective grid threshold.

In step 508, the centralized processing device further screens the temporary effective grids and reserves the temporary effective grids with the number being less than or equal to the effective grid threshold as the effective grids.

In some examples of this embodiment, if the number of temporary effective grids exceeds the effective grid threshold, the centralized processing device may preferentially select temporary effective grids higher ratios of a number of effective neighbor cells to a number of total neighbor cells as the effective grids when further screening the temporary effective grids. For example, assuming that there are currently five temporary effective grids (grid identifications of which are a, b, c, d, e, respectively), the ratios of the number of effective neighbor cells of the five temporary effective grids to the number of total neighbor cells are 2/3, 4/5, 1/3, 3/5, and 5/5, respectively. The effective grid threshold is 3, so the temporary effective grids reserved by the centralized processing device may be a, b and e.

In step 510, the centralized processing device determines whether the number of neighbor cells contained in each of the effective grids exceeds a neighbor cell threshold.

If the number of neighbor cells contained in each of the effective grids exceeds the neighbor cell threshold, the centralized processing device proceeds to step 512. If the number of neighbor cells contained in each of the effective grids does not exceed the neighbor cell threshold, the centralized processing device proceeds to step 514.

In step 512, the centralized processing device screens the neighbor cells in each effective grid.

In other examples of this embodiment, the centralized processing device may reserve neighbor cells having higher neighbor cell weights in the effective grid and remove remaining neighbor cells. The "neighbor cell weight" here is obtained by normalizing a neighbor cell quality average value of a neighbor cell in the effective grid and then respectively multiplying the neighbor cell quality average value, overlapping coverage degree and handover success rate of the neighbor cell by each respective corresponding weight. For example, the neighbor cell threshold is 2, assuming that there are currently three neighbor cells (neighbor cell identifications of which are a, b and c respectively) in an effective grid, the neighbor cell quality average values of the three neighbor cells are normalized to 0.6, 0.2 and 0.5 respectively, the overlapping coverage degrees of the effective grid with the three neighbor cells are 68%, 80% and 25%, respectively, and the handover success rates of the three neighbor cells are 55%, 80% and 98% respectively and weights of the neighbor cell quality average value, overlapping coverage degree and handover success rate are q1, q2 and q3 respectively. There is no doubt that a sum of the q1, q2 and q3 is 1. Then, for a neighbor cell a, a neighbor cell weight Q1 is 0.6*q1+0.68*q2+0.55*q3; for a neighbor cell b, a neighbor cell weight Q2 is 0.2*q1+0.8*q2+0.8*q3; and for a neighbor cell c, a neighbor cell weight Q3 is 0.5*q1+0.25*q2+0.98*q3. Consequently, the neighbor cells selected by the centralized processing unit to reserve are two neighbor cells corresponding to two weights with larger values in the Q1, Q2 and Q3.

In addition, the centralized processing device may determine a screening model based on history learning, and then select neighbor cells based on the screening model instead of selecting based on weight results of multiple factors.

In step 514, the effective radio frequency fingerprint database is created based on the effective grids.

After the effective grids are determined and the number of neighbor cells in each effective grid meets the requirements, the centralized processing device may create the effective radio frequency fingerprint database based on the determined effective grids.

It should be understood that the creation of the effective radio frequency fingerprint database by the centralized processing device is based on the historical data reported by the terminal. However, after the effective radio frequency fingerprint database is created, conditions of each terminal are constantly changing, that is, the wireless communication characteristics of the terminal are not invariable. Therefore, in order to ensure that the creation of the effective radio frequency fingerprint database may conform to the real-time wireless communication characteristics of each terminal as far as possible and has real-time ability. Therefore, in this embodiment, the centralized processing device continuously updates the effective radio frequency fingerprint database according to the data reported by the terminal in real time after the effective radio frequency fingerprint database is created.

The radio frequency fingerprint database created in this way not only has a high effective grid proportion, but also reduces the need for storage resources of the base station, and improves the application effect of the radio frequency fingerprint database while reducing the occupation of the storage and processing resources of the base station, which is beneficial for the optimal configuration of the resources.

More importantly, in the radio frequency fingerprint database creation scheme provided in this embodiment, the neighbor cell information in the radio frequency fingerprint database may embody the relationship between a grid and each neighbor cell because the neighbor cell information statistics of each neighbor cell is performed on each grid, thereby providing more information for reference for the base station to use the effective radio frequency fingerprint database for subsequent radio resource management, enhancing the role of the radio frequency fingerprint database in radio resource management, and improving the application effect the radio frequency fingerprint database.

Embodiment 2

The method for the radio frequency fingerprint database creation is described in Embodiment 1. It should be understood that the base station may apply the created radio frequency fingerprint database to the radio resource management (RRM) after the creation of the radio frequency fingerprint database is completed. Therefore, the application of the radio frequency fingerprint database will be described in this embodiment.

Since the radio frequency fingerprint database used for radio resource management is created by the centralized processing device, in this embodiment, the base station first obtains the effective radio frequency fingerprint database from the centralized processing device, and then applies the effective radio frequency fingerprint database to perform radio resource management on the terminal after obtaining the effective radio frequency fingerprint database.

Figure 6:
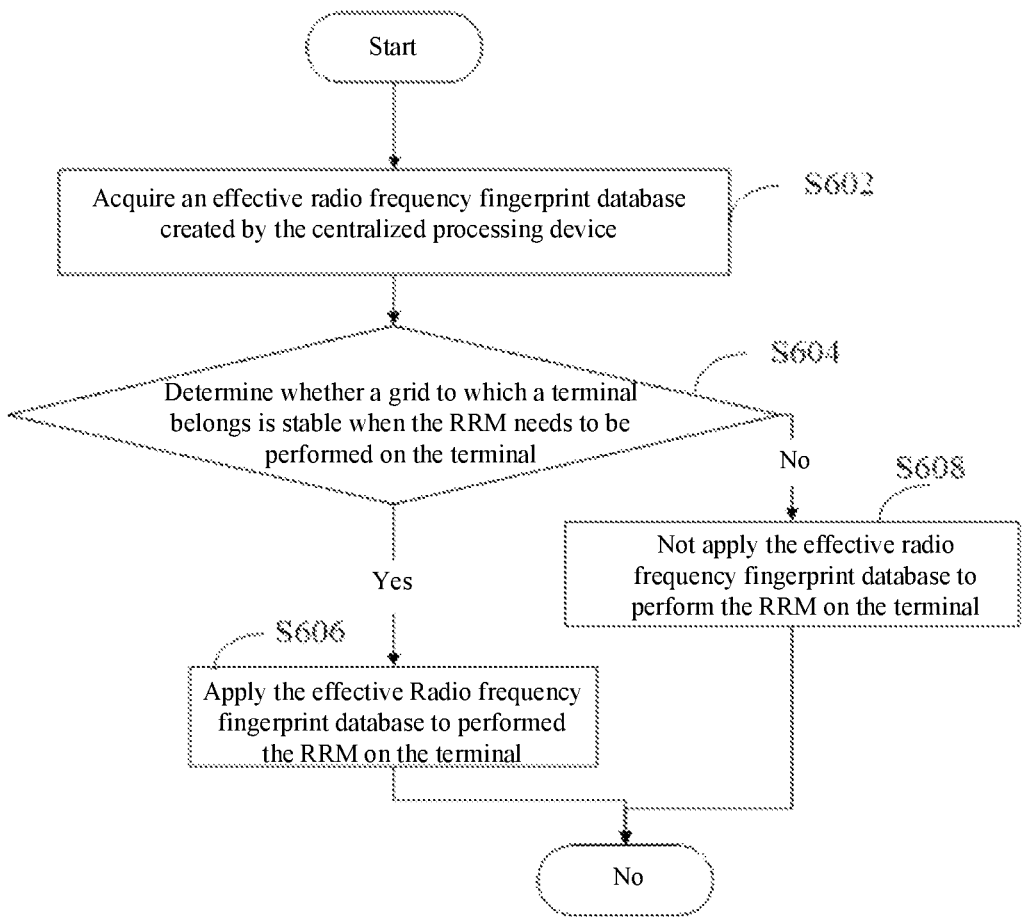
FIG. 6 is a flowchart of applying an effective radio frequency fingerprint database based on stability of a grid to which a terminal belongs provided in Embodiment 2 of the present disclosure.

In the related technologies, the grid application does not consider characteristics of the terminal. That is, if a terminal moves fast and a reporting interval of intra-frequency measurement of the terminal is long, the base station may locate grids of the terminal inaccurately in a case that the base station only relies on latest reported intra-frequency measurement results to locate. For example, the base station determines that a certain terminal belongs to a grid 1 based on the latest reported intra-frequency MR of the terminal, but in fact, the terminal may have moved away from the grid 1 and entered another grid. In this case, if the base station continues to perform the radio resource management on the grid 1 according to the grid 1 to which the terminal belongs, the radio resource management effect may be poor. In order to solve the problem that the radio frequency fingerprint database application effect is affected due to the ignoration of the characteristics of the terminal in the related radio frequency fingerprint database application schemes, this embodiment provides a new method for radio frequency fingerprint database application, as shown in FIG. 6.

In step 602, an effective radio frequency fingerprint database created by the centralized processing device is acquired.

In this embodiment, the effective radio frequency fingerprint database acquired by the base station is created by the centralized processing device with reference to the method described in Embodiment 1. Here, the centralized processing device may be any of a network management device, a network management system, a big data platform, a cloud platform, MEC, or the like.

In step 604, it is determined whether a grid to which a terminal belongs is stable when the RRM needs to be performed on the terminal.

If the grid to which the terminal belongs is stable, step 606 is executed. If the grid to which the terminal belongs is not stable, step 608 is executed.

In this embodiment, the base station only applies the effective radio frequency fingerprint database to perform radio resource management on the terminals that belong to stable grids, and for other terminals that belong to frequently-changed grids, the effective radio frequency fingerprint database is not used for RRM. Because the grids to which the terminals belong are frequently changed, it is difficult for the base station to accurately locate a current real-time grid of the terminal, so that the RRM performed on the terminal through the application of the effective radio frequency fingerprint database is invalid.

Figure 7:
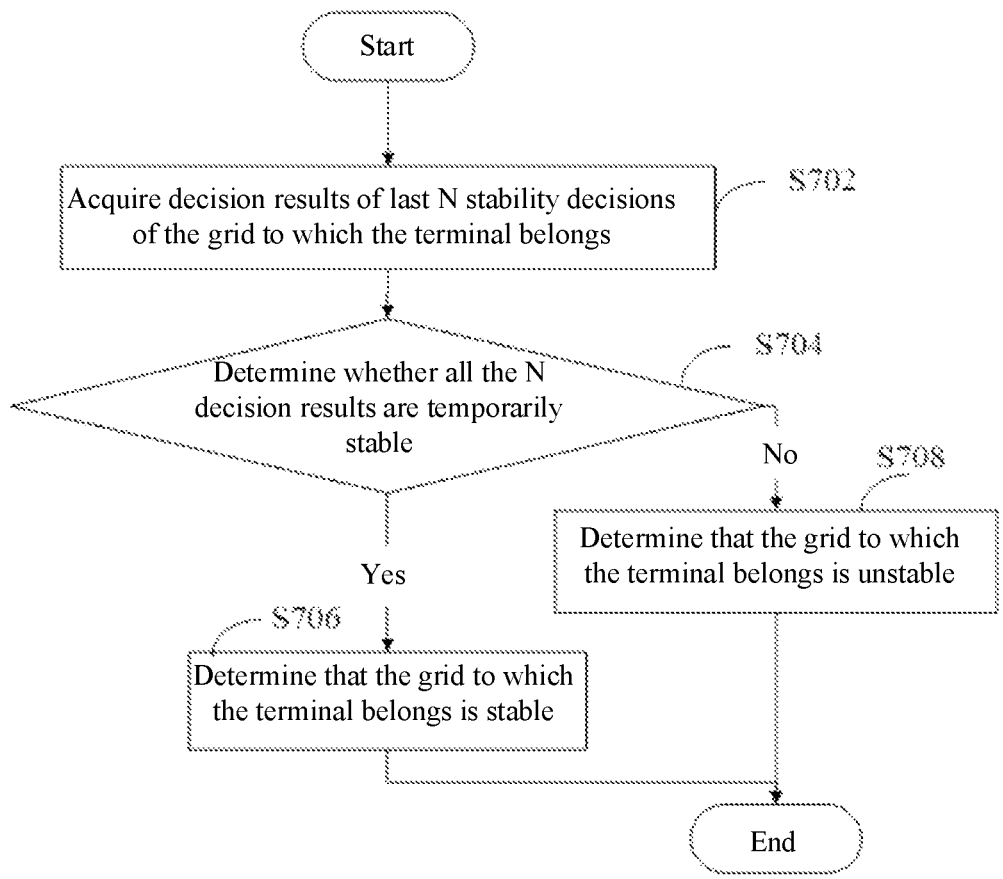
FIG. 7 is a flowchart of determining stability of a grid to which a terminal belongs provided in Embodiment 2 of the present disclosure.

In one example of this embodiment, the terminal on which RRM needs to be performed currently may determine whether the grid to which the terminal belongs is stable in the following manner with reference to the flowchart shown in FIG. 7.

In step 702, decision results of last N stability decisions of the grid to which the terminal belongs is acquired.

In this embodiment, after the base station receives the intra-frequency MR reported by the terminal, the base station may determine, through an intra-frequency MR reported by the terminal this time, which grid the terminal currently belongs to and whether this grid is the same as a grid indicated by an intra-frequency MR reported by the terminal at previous time. If this grid is the same as the grid indicated by the intra-frequency MR reported by the terminal at previous time, the base station may determine that a decision result of a stability decision of the terminal at this time is temporarily stable. If this grid is different from the grid indicated by the intra-frequency MR reported by the terminal at previous time, the base station further determines whether an effective neighbor cell to which the terminal belongs in the intra-frequency MR reported by the terminal at this time is the same as that in the intra-frequency MR reported by the terminal at previous time. If the effective neighbor cell to which the terminal belongs in the intra-frequency MR reported by the terminal at this time is the same as that in the intra-frequency MR reported by the terminal at previous time, the base station may also determine that the decision result of the stability decision of the terminal at this time is temporarily stable. And if the effective neighbor cell to which the terminal belongs in the intra-frequency MR reported by the terminal at this time is different from that in the intra-frequency MR reported by the terminal at previous time, the base station determines that the decision result is temporarily unstable.

In some examples of this embodiment, the base station sets "UeStableWindow" (terminal stability statistics window) for each terminal, and the decision results of the last N stability decisions of the terminal may be recorded in the stability statistics window. Referring to a schematic diagram of a terminal stability statistics window shown in FIG. 8, in a terminal stability statistics window 80 shown in FIG. 8, the length of the terminal stability statistics window 80 is 5. A decision result recorded on the leftmost side of the terminal stability statistics window 80 is a result of one stability decision farthest from the current time, and a decision result recorded on the rightmost side of the terminal stability statistics window 80 is a result of the latest stability decision. In this embodiment, "1" represents that the decision result is "temporarily stable," and "0" represents that the decision result is "temporarily unstable." Then, in the five decision results recorded in the terminal stability statistics window 80 in FIG. 8, the earliest decision result is "temporarily unstable," and the remaining decision results are all "temporarily stable."

In step 704, it is determined whether all the N decision results are temporarily stable.

If all the N decision results are temporarily stable, step 706 is executed. If not all the N decision results are temporarily stable, step 708 is executed.

In this embodiment, whether a grid to which a terminal belongs is stable needs to be determined in combination with the decision results of the last N stability decisions of the terminal. Here, N is an integer greater than or equal to 2, for example, 5, 8, or the like. It should be understood that the determining of whether the decision results of the last N stability decisions are all temporarily stable is actually determining of whether the decision results of N consecutive stability decisions are all temporarily stable. From the perspective of intra-frequency MR, it is required that grids indicated by the intra-frequency MRs reported by the terminal for N consecutive times are the same, or although the grids are different, the effective neighbor cells of the new and old grids are the same.

Figure 8:
FIG. 8 is a schematic diagram of a terminal stability statistics window provided in Embodiment 2 of the present disclosure.

If the base station records the decision result of each stability decision using the terminal stability statistics window 80 shown in FIG. 8, the base station may determine that the grid to which the terminal belongs is stable only when all values in the terminal stability statistics window 80 are "1," otherwise the base station may determine that the grid to which the terminal belongs is unstable.

In step 706, it is determined that the grid to which the terminal belongs is stable.

If it is determined that the decision results of all the last N stability decisions of the terminal are temporarily stable, the base station determines that the grid to which the terminal belongs is stable. Therefore, the base station applies the effective radio frequency fingerprint database to perform the radio resource management on the terminal.

In step 708, it is determined that the grid to which the terminal belongs is unstable.

If it is determined that the decision results of the last N stability decisions of a certain terminal are not all temporarily stable, the base station determines that the grid to which the terminal belongs is unstable. Therefore, even though it is required to perform the RRM on the terminal, the base station does not apply the information in the effective radio frequency fingerprint database to perform the RRM on the terminal.

In step 606, the effective Radio frequency fingerprint database applied to performed the RRM on the terminal.

If the base station determines that the grid to which the terminal belongs is stable, the effective radio frequency fingerprint database may be applied to perform the radio resource management on the terminal. The radio resource management herein includes load balancing management, voice fallback management, and the like.

In step 608, the effective radio frequency fingerprint database is not applied to perform the RRM on the terminal.

If determining that the grid to which the terminal belongs is unstable, the base station does not apply the effective radio frequency fingerprint database to perform the RRM on the terminal but implements the radio resource management on the terminal in other manners.

In some examples of this embodiment, the base station may also update at least one of the following information of the grid to which the terminal belongs with reference to MR and HO information reported by the terminal in real time: the number of MRs participating in the grid construction, a neighbor cell quality average value, the number of reporting times of neighbor cell quality being greater than a first threshold, the number of neighbor cell reporting times, and the number of handover attempts and the number of handover successes for a neighbor cell.

In one example of this embodiment, the base station updates the above five types of information in combination with the MR and HO information reported by the terminal in real time. Herein, the MR may include at least one of an intra-frequency MR, an inter-frequency MR and an inter-system MR, and the HO information may include an inter-frequency HO and/or an inter-system HO.

It should be noted that, the update of the base station usually does not add a new grid and a new neighbor cell. If a grid or neighbor cell does not exist, it is likely that the centralized processing device removes the grid or neighbor cell based on the screening principle such as statistical significance when creating the effective Radio frequency fingerprint database. Therefore, in this case, it is not necessary to add the grid or neighbor cell that has been removed.

In some examples of this embodiment, the base station may generate a terminal list (UElist) for each grid when managing terminals of each grid. In the UElist, unique identification information of all the terminals in the grid, such as hardware identifications of the terminals, is recorded. In this way, during performing the radio resource management on the terminal according to the intra-frequency MR reported by the terminal in real time, the base station may directly query whether the grid to which the terminal belongs changes according to the unique identification information of the terminal. In addition, during updating the effective radio frequency fingerprint database according to the information reported by the terminal in real time, the base station may also determine a current corresponding grid index of the terminal according to the intra-frequency MR reported by the terminal in real time and determine whether the grid to which the terminal belongs is changed. If the grid to which the terminal belongs is changed, a UElist of the new and old grids is updated. If a terminal does not originally exist in the effective radio frequency fingerprint database, the terminal may be written into the UElist corresponding to a current grid to which the terminal belongs.

It should be understood that the base station is triggered to delete a terminal from the UElist of the grid to which the terminal belongs when the handover or service releasing of the terminal occurs.

In some examples of this embodiment, the base station is not limited to recording the unique identification information and the stability decision result of the terminal in the effective radio frequency fingerprint database when applying the effective radio frequency fingerprint database, and may also record information such as speed estimation of the terminal.

In the method for radio frequency fingerprint database application provided in this embodiment, when the RRM is performed on the terminal, the stability of the grid to which the terminal belongs is considered, and whether the RRM is able to be performed on the terminal based on the effective radio frequency fingerprint database is determined based on the stability of the grid to which the terminal belongs, thereby avoiding unreasonable radio resource management performed on the terminal by the application of the effective radio frequency fingerprint database due to ignoration of the wireless communication characteristics of the terminal, clarifying an application range of the effective radio frequency fingerprint database, and reducing terminal performance loss caused by inaccurate grid matching.

In this embodiment, since the terminals in each grid are recorded in the effective radio frequency fingerprint database through the UElist, a process of temporarily determining the grid index according to the intra-frequency MR reported by the terminal to match the grid is avoided when the effective radio frequency fingerprint database is applied or updated, so that a processing delay is shortened, a processing efficiency on the base station side is improved, and communication experience on the user side is enhanced.

Embodiment 3

Figure 9:
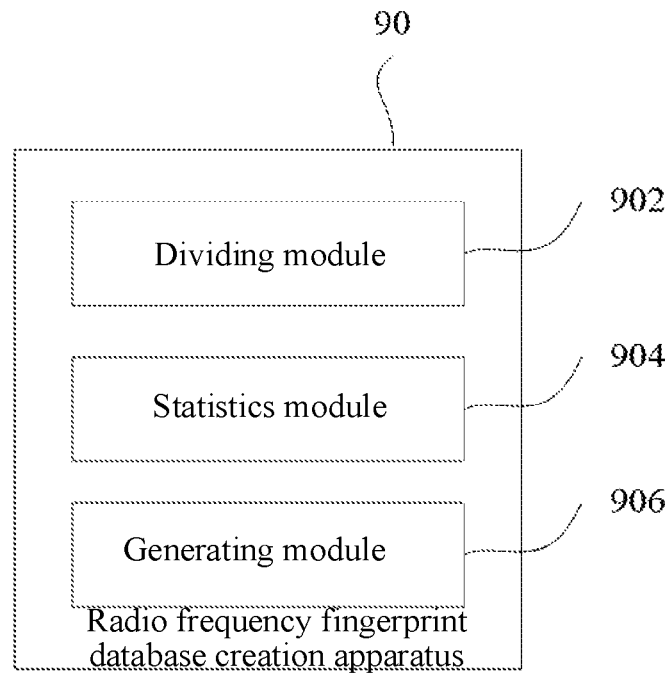
FIG. 9 is a schematic structural diagram of an apparatus for radio frequency fingerprint database creation provided in Embodiment 3 of the present disclosure.

This embodiment provides an apparatus for radio frequency fingerprint database creation. Referring to FIG. 9, a radio frequency fingerprint database creation apparatus 90 may be deployed on a centralized processing device, and may include a dividing module 902, a statistics module 904 and a generating module 906. The dividing module 902 is configured to divide a cell into a plurality of grids according to a plurality of grid indexes and historical data reported by each of a plurality of terminals in the cell, and one grid index is used to uniquely identify one grid. The statistics module 904 is configured to perform neighbor cell information statistics on each of a plurality of neighbor cells of the cell in each of the plurality of grids. The generating module 906 is configured to generate an effective radio frequency fingerprint database corresponding to the cell according to a result of the dividing and a result of the neighbor cell information statistics.

In some examples of this embodiment, the grid index includes a serving cell identification, serving cell quality, a strongest intra-frequency neighbor cell identification, strongest intra-frequency neighbor cell quality, a second strongest intra-frequency neighbor cell identification and second strongest intra-frequency neighbor cell quality. In other examples of this embodiment, the grid index may include only the serving cell identification, the serving cell quality, the strongest intra-frequency neighbor cell identification and the strongest intra-frequency neighbor cell quality.

The historical data includes a measurement report MR and handover HO information reported by a terminal within a preset period of time from a current time, alternatively, the historical data includes a preset number of MRs and the HO information recently reported by the terminal.

Herein, the MR includes an intra-frequency MR and one or both of an inter-frequency MR and an inter-system MR, and the HO information includes one or both of an inter-frequency HO and an inter-system HO.

The dividing module 902 may first perform association filling processing on the historical data reported by each terminal in the cell, and then divide the cell into the plurality of grids according to the plurality of grid indexes and the historical data after the association filling processing.

Alternatively, for each terminal, the dividing module 902 associates the intra-frequency MR, the inter-frequency MR, the inter-system MR, the inter-frequency HO and the inter-system HO successively reported by the each terminal to obtain the historical data of the each terminal. And for history data in which a number of intra-frequency neighbor cells is less than M, the history data is filled to obtain the history data after the association filling processing. M is a positive integer.

When generating the effective radio frequency fingerprint database corresponding to the cell according to the result of the dividing and the result of the neighbor cell information statistics, the generating module 906 may first generate the initial radio frequency fingerprint database according to the result of the dividing and the result of the neighbor cell information statistics, and then screen grids in the initial radio frequency fingerprint database to determine the effective radio frequency fingerprint database.

When screening the grids in the initial radio frequency fingerprint database to determine the effective radio frequency fingerprint database, the generating module 906 may remove grids whose number of MRs participating in grid construction is less than a construction threshold in the initial radio frequency fingerprint database, remove neighbor cells whose number of neighbor cell reporting times is less than a reporting threshold in the initial radio frequency fingerprint database, select neighbor cells of which neighbor cell quality average values, overlapping coverage degrees and handover success rates are respectively greater than each respective corresponding threshold as effective neighbor cells, and use grids containing at least one effective neighbor cell as temporary effective grids. If the number of the temporary effective grids does not exceed an effective grid threshold, the generating module 906 takes all the temporary effective grids as effective grids, and constructs the effective radio frequency fingerprint database based on the effective grids.

If the number of temporary effective grids exceeds the effective grid threshold, the generating module 906 further screens the temporary effective grids to obtain final effective grids whose number is less than or equal to the effective grid threshold according to at least one of the following principles before the effective radio frequency fingerprint database is created based on the effective grids, and takes all the final effective grids as the effective grids. The principles are: preferentially selecting the temporary effective grids having higher ratios of a number of effective neighbor cells to a number of total neighbor cells as the final effective grids, and preferentially selecting the temporary effective grids with higher neighbor cell weights, where each of the neighbor cell weights is obtained by normalizing a neighbor cell quality average value of a neighbor cell in each of the effective grids and then respectively multiplying the neighbor cell quality average value, an overlapping coverage degree and a handover success rate of the neighbor cell by each respective corresponding weight.

In this embodiment, the neighbor cell information of a certain neighbor cell collected in a grid may represent at least one of the following: neighbor cell quality of the neighbor cell measured in the grid, an overlapping coverage degree of the neighbor cell in the grid, a handover success rate of handover of a terminal to the neighbor cell in the grid.

The neighbor cell information includes the neighbor cell quality, the overlapping coverage degree, and the handover success rate.

Before statistics is performed on the neighbor cell information of each neighbor cell in each divided grid, the statistics module 904 counts the number of MRs participating in the grid construction for each grid. Then, the statistics module 904 collects the following information about each neighbor cell of the cell in each divided grid: statistics may be performed on the following information for each neighbor cell of the cell in each grid: a neighbor cell quality average value, a number of reporting times of neighbor cell quality being greater than a first threshold, a number of neighbor cell reporting times, and a number of handover attempts and a number of handover successes for each neighbor cell. The centralized processing device on which the radio frequency fingerprint database creation apparatus 90 is deployed may be any one of a network management device, a network management system, a big data platform, a cloud platform, a MEC, or the like. The functions of the dividing module 902, the statistics module 904, and the generating module 906 may be implemented by a processor of the network device.

Figure 10:
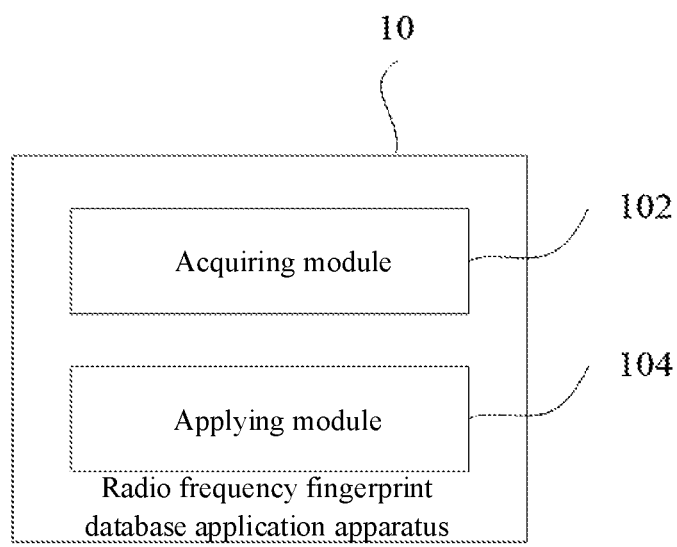
FIG. 10 is a schematic structural diagram of an apparatus for radio frequency fingerprint database application provided in Embodiment 3 of the present disclosure.

This embodiment further provides an apparatus for radio frequency fingerprint database application. Referring to the schematic structural diagram of the apparatus for the radio frequency fingerprint database application shown in FIG. 10. The radio frequency fingerprint database application apparatus includes an acquiring module 102 and an applying module 104. The acquiring module 102 is configured to acquire an effective radio frequency fingerprint database created by a centralized processing device, and the applying module 104 is configured to apply the effective radio frequency fingerprint database to perform radio resource management RRM on a plurality of terminals.

In some examples of this embodiment, the applying module 104 needs to determine that a grid to which a certain terminal belongs is stable first when the RRM needs to be performed on the terminal, and then applies the effective radio frequency fingerprint database to perform the RRM on the terminal.

Alternatively, the applying module 104 may determine whether the decision results of the last N stability decisions of the grid to which the terminal belongs are all temporarily stable when determining whether the grid to which the terminal belongs is stable.

If it is determined that the decision results of the last N stability decisions of the grid to which the terminal belongs are all temporarily stable, the applying module 104 determines that the grid to which the terminal belongs is stable, and therefore the effective radio frequency fingerprint database is applied to perform the RRM on the terminal. If it is determined that the decision results of the last N stability decisions of the grid to which the terminal belongs are not all temporarily stable, the effective radio frequency fingerprint database is not applied to perform the RRM on the terminal.

In a stability decision, if grids to which the terminal belongs in intra-frequency measurement reports MRs respectively reported by the terminal at this time and at previous time are the same, or that the grids to which the terminal belongs in intra-frequency measurement reports MRs respectively reported by the terminal at this time and at previous time are different but effective neighbor cells to which the terminal belongs in intra-frequency measurement reports MRs respectively reported by the terminal at this time and at previous time are the same, it is determined that the grid to which the terminal belongs is temporarily stable. Here, N is a positive integer greater than or equal to 2.

In addition, in this embodiment, the effective radio frequency fingerprint database includes a terminal list uniquely corresponding to the grid, and the terminal list records unique identification information of each terminal in the grid.

The radio frequency fingerprint database application apparatus 10 may also update the following information of the grid to which the terminal belongs according to the MRs and the HO information reported by the terminal in real time: a number of MRs participating in grid construction, a neighbor cell quality average value, a number of reporting times of neighbor cell quality being greater than a first threshold, a number of neighbor cell reporting times, and a number of handover attempts and a number of handover successes for the neighbor cell.

The radio frequency fingerprint database application apparatus 10 in this embodiment may be deployed on a base station, and the base station applies the effective radio frequency fingerprint database to perform radio resource management on the terminal. The function of the acquiring module 102 may be implemented by a processor of the base station controlling a communication unit, for example, the processor of the base station controls the communication unit to receive the effective radio frequency fingerprint database transmitted by a centralized processing device such as a network management device. The functions of the applying module 104 may be implemented by a processor of the base station.

Embodiment 4

This embodiment provides a storage medium storing one or more computer programs able to be read, compiled and executed by one or more processors. In this embodiment, the storage medium may store one of a radio frequency fingerprint database creation program and a radio frequency fingerprint database application program, and the radio frequency fingerprint database creation program may be executed by the one or more processors to perform any one of the methods for radio frequency fingerprint database creation described in the above embodiments. The radio frequency fingerprint database application program may be executed by the one or more processors to perform any one of the methods for radio frequency fingerprint database application described in the above embodiments.

Figure 11:
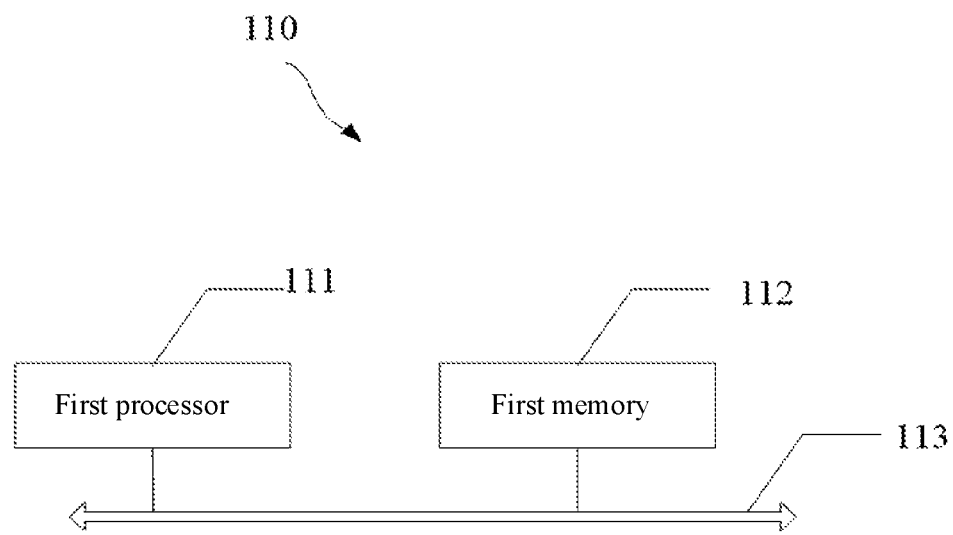
FIG. 11 is a schematic diagram of a hardware structure of a centralized processing device provided in Embodiment 4 of the present disclosure.

This embodiment further provides a centralized processing device. As shown in FIG. 11, the centralized processing device 110 includes a first processor 111, a first memory 112, and a first communication bus 113 configured to realize communication connection between the first processor 111 and the first memory 112. The first memory 112 may be the storage medium storing the radio frequency fingerprint database creation program. The first processor 111 may read, compile and execute the radio frequency fingerprint database creation program to perform the steps in the method for the radio frequency fingerprint database creation described in the above embodiment. For details of the method for the radio frequency fingerprint database creation performed by the centralized processing device 110, referring to the description of the above embodiment, and details are not repeated herein.

Figure 12:
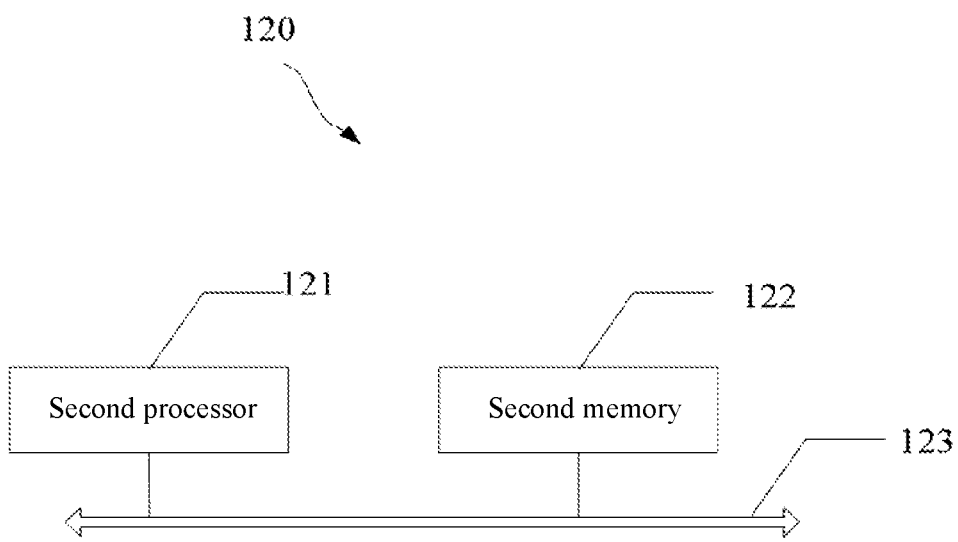
FIG. 12 is a schematic diagram of a hardware structure of a base station provided in Embodiment 4 of the present disclosure.

This embodiment further provides a base station. As shown in FIG. 12, the base station 120 includes a second processor 121, a second memory 122, and a second communication bus 123 configured to realize communication connection between the second processor 121 and the second memory 122. The second memory 122 may be the storage medium storing the radio frequency fingerprint database application program. The second processor 121 may read, compile and execute the radio frequency fingerprint database application program to perform the steps in the method for the radio frequency fingerprint database application described in the above embodiment. For details of the method for the radio frequency fingerprint database application by the base station 120, referring to the description of the above embodiment, and details are not repeated herein.

Figure 13:
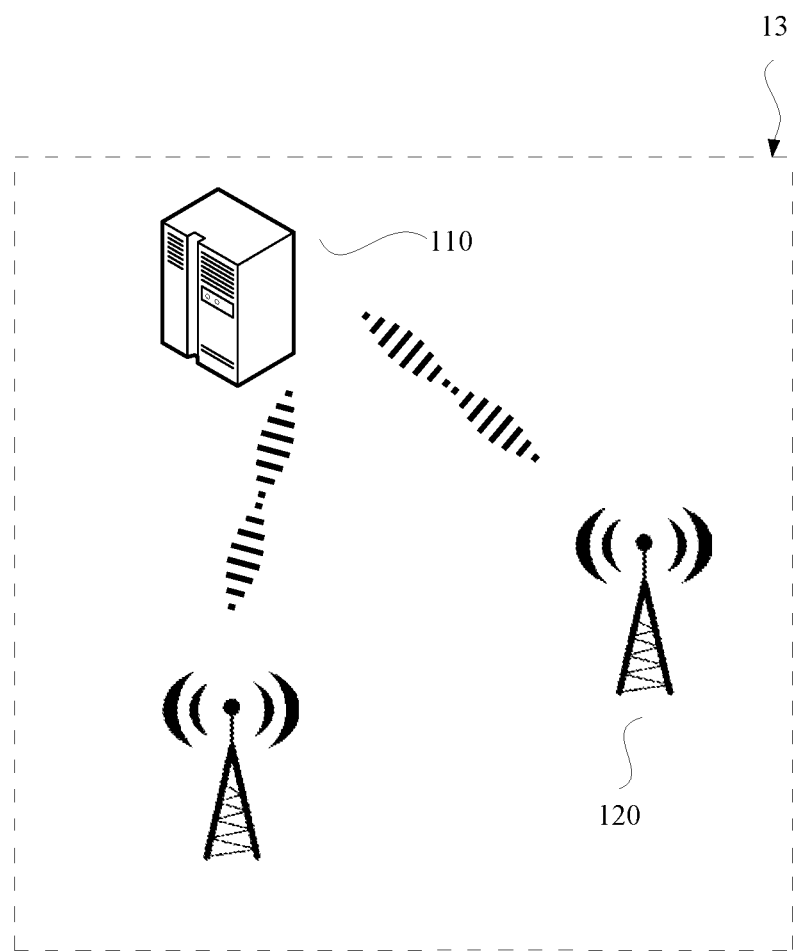
FIG. 13 is a schematic diagram of a communication system provided in Embodiment 4 of the present disclosure.

The present embodiment further provides a communication system, as shown in FIG. 13, which includes the centralized processing device 110 and the base station 120. In some examples, the communication system 13 includes one centralized processing device 110 and a plurality of base stations 120, and the centralized processing device 110 is communicatively coupled to each base station 120. The centralized processing device 110 may be responsible for creating the effective radio frequency fingerprint database and delivering the effective radio frequency fingerprint database to each base station 120 for application. In other examples of this embodiment, the communication system may include more than one centralized processing device 110.

Embodiment 5

In order to make the advantages and details of the above methods for radio frequency fingerprint database creation and application more clear to those skilled in the art, this embodiment continues to describe the method for radio frequency fingerprint database creation and the method for radio frequency fingerprint database application provided in the above embodiments with some examples.

FIG. 14 shows an architectural diagram of the communication system that creates and applies the radio frequency fingerprint database provided in this embodiment. Assuming that a communication system here is the communication system 13 in FIG. 13.

The communication system 13 includes a centralized processing device 110 and a base station 120. The centralized processing device 110 communicates with the base station 120 via a communication interface 130, and the communication interface 130 may transmit an effective radio frequency fingerprint database created by the centralized processing device 110 to the base station 120.

The centralized processing device 110 is mainly used for the creation of the radio frequency fingerprint database, and mainly composed of a data storage unit 112 and a fingerprint database creation unit 114.

The data storage unit 112 is configured to store data required to create the radio frequency fingerprint database. The fingerprint database creation unit 114 is configured to generate the effective radio frequency fingerprint database based on the data of the data storage unit 112. The fingerprint database creation unit 114 includes the following three portions.

1) A data preprocessing portion 1141, which is configured to preprocess the data stored in the data storage unit 112, such as data extraction, data association integration, data filling, and the like.

2) A fingerprint database generating portion 1142, which is configured to perform grid division according to a particular rule based on the processed data, that is, determine grid indexes, and then perform neighbor cell characteristic statistics (e.g., information such as wireless signal characteristics) in the grid to generate the initial radio frequency fingerprint database.

3) A fingerprint database screening portion 1143, which is configured to screen the effective radio frequency fingerprint database from the initial fingerprint database based on particular requirements on statistical significance and wireless signal characteristics.

The base station 120 mainly implements the further update of the effective radio frequency fingerprint database and the application of the effective radio frequency fingerprint database. The base station 120 mainly includes the following three units.

An RRM unit 122, which is configured to provide a fingerprint application unit 124 with a necessary input required for the fingerprint application, such as a fingerprint database query target, when determining that the effective radio frequency fingerprint database is able to be applied for RRM function optimization.

A fingerprint application unit 124, which is a fingerprint application module superimposed on the RRM unit 122, and is configured to query an extension and update unit 126 to obtain required information of the fingerprint database, and analyze the information to obtain a guiding opinion useable for a function, such as a terminal capable of performing the function and a target neighbor cell of the terminal, to feedback the guiding opinion to the RRM unit 122.

The extension and update unit 126, which is configured to extend and update the fingerprint database information. The extension and update unit 126 updates the UElist corresponding to the grid and statistical results of neighbor cell information according to the information reported by the terminal in real time.

Based on the above system architecture, this embodiment will introduce the method for radio frequency fingerprint database creation and the method for the radio frequency fingerprint database application provided in the above embodiment in combination with the following examples.

In step1, data preprocessing is performed.

1. Data of the intra-frequency MR, inter-frequency and inter-system MRs and inter-frequency and inter-system HOs of last N days (e.g., one week) of the serving cell to be optimized is obtained.

2. The intra-frequency MR, inter-frequency MR or inter-system MR reported successively by the user equipment (UE) under a particular condition are associated, and MRs unable to be associated are directly discarded.

3. The data of the associated MRs is screened and ineffective MRs are removed. For example, MRs with "no measurement result of inter-frequency and inter-system neighbor cell" and "no measurement result of intra-frequency neighbor cell and the serving cell quality being less than a particular threshold" are removed.

4. The MR and the HO are associated, handover execution and results (attempt and success/failure) of handover to the target cell in the HO are merged into the MR associated with the HO for recording.

5. Information of cell identification, quality and handover required for the fingerprint database creation is extracted from the MR, and characteristic quantities related to the cell identification are integrated to obtain an unique cell identification.

In step 2, the initial fingerprint database is generated.

1. Grid construction is performed based on serving cells, at most two intra-frequency neighbor cells with best quality and measurement results of the at most two intra-frequency neighbor cells as indexes. A format of a grid index is shown in FIG. 2.

2. Inter-frequency and inter-system neighbor cell characteristic statistics are performed at a grid level, that is, inter-frequency and inter-system neighbor cell information statistics in MRs with the same index is performed in the grid corresponding to the index, to obtain the statistical information such as wireless signal characteristics and handover characteristics of the neighbor cell. For example, 1) the number of MRs participating in the grid construction; 2) the neighbor cell quality average value; 3) the number of reporting times of neighbor cell quality being greater than a first threshold; 4) the number of neighbor cell reporting times; and 5) the number of handover attempts and the number of handover successes for the neighbor cell.

In step 3, the effective radio frequency fingerprint database is screened and the base station is synchronized.

1. First, the screening is performed based on statistical significance to remove a grid whose "number of MRs participating in the construction of the grid" is less than a construction threshold from the grid.

2. Neighbor cell effectiveness screening is performed. That is, neighbor cells of which neighbor cell quality, overlapping coverage degrees and handover success rates are respectively greater than each respective corresponding threshold are selected as effective neighbor cells. Grids containing at least one effective neighbor cell as regarded as temporary effective grids, and ineffective grids are removed from the initial radio frequency fingerprint database.

3. It is determined that whether the number of effective neighbor cells/grids exceeds a base station/interface limit value. If the number of effective neighbor cells/grids does not exceed the base station/interface limit value, all the effective neighbor cells/grids are recorded as the effective radio frequency fingerprint database to be transmitted to the base station. If the number of effective neighbor cells/grids exceeds the base station/interface limit value, the screening is carried out according to the following principles, and the screened effective neighbor cells/grids are recorded as the effective radio frequency fingerprint database to be transmitted to the base station.

If the number of the effective grids exceeds the limit, a ratio of the number of effective neighbor cells to the number of all the neighbor cells in the grid is calculated, and grids with higher proportions of effective neighbor cells are preferentially selected.

If the number of effective neighbor cells in the grid exceeds the limit, reference signal received powers (RSRP) of the neighbor cells are normalized first, and then weighting and multiplying are performed on the neighbor cell quality average value, the overlapping coverage degree and the handover success rate of each neighbor cell to obtain the weight of each neighbor cell, and finally neighbor cells with the higher weights are preferentially selected.

In step 4, the base station extends and updates the information of the fingerprint database according to the information reported by UEs in real time.

1. The Uelist in the grid is updated according to the intra-frequency MR reported by a UE.

First, a grid index is generated according to the intra-frequency MR of the UE. Here, assuming that a grid index corresponding to a certain terminal is a grid 1, denoted as grid1. Then, a UE identification and the gird1 are queried in the effective radio frequency fingerprint database.

If the UE identification already exists in the fingerprint database but the grid where the UE located is not the grid1 but a grid2, the UE identification is deleted from the UElist of the grid2 while the UE identification is written to the UElist of the grid1. It is determined that whether effective neighbor cells of the grid1 and effective neighbor cells of the grid2 are the same. If the effective neighbor cells of the grid1 and the effective neighbor cells of the grid2 are the same, it is considered that there is no change between the last two MRs of the UE, and the latest bit of the stability statistics window UeStableWindow is set to 1. If the effective neighbor cells of the grid1 and the effective neighbor cells of the grid2 are different, it is considered that there is a change between the last two MRs of the UE, and the latest bit of the stability statistics window UeStableWindow is set to 0.

If the UE identification does not exist in the fingerprint database and the grid1 exists in the fingerprint database, the UE is written to the UElist of the grid1. Since the UE is written in the UElist of the grid1 for the first time, all bits of UeStableWindow are initially set to 1 and the grid1 is considered to be stable by default.

If the UE identification already exists in the fingerprint database and the grid to which the UE belongs is not changed, it is considered that there is no change between the last two MRs of the UE, and the latest bit of UeStableWindow is set to 1.

Consequently, the base station 120 determines a stable state of the UE according to the UeStableWindow. Assuming that a window length is 5, the base station 120 considers the UE as the stable state and sets UeStableIndicator to be "true" when element bits of UeStableWindow are all 1, i.e., there is no change for 5 consecutive times.

2. When handover and service releasing of a UE occurs, the base station 120 queries the UE identification in the effective radio frequency fingerprint database and deletes the UE identification from the UElist of the grid to which the UE belongs.

3. Information of the grid is updated when the UE reports inter-frequency/inter-system MRs.

The effective radio frequency fingerprint database is queried according to the UE identification. If the UE identification exists in the effective radio frequency fingerprint database, information updating is performed on neighbor cells already reported in the current inter-frequency/inter-system MR and existing in the grid, that is, no new neighbor cell is added.

4. Information of the grid is updated when inter-frequency/inter-system handover of the UE occurs.

The effective radio frequency fingerprint database is queried according to the UE identification. If the UE identification exists in the effective radio frequency fingerprint database and a target cell of the current handover exists in the grid, a handover result (attempt and success/failure) of the current handover is updated to the handover information of the target cell.

In step 5, a load balancing function is applied to the effective radio frequency fingerprint database.

1. The load balancing function is triggered, a list of candidate UEs is screened out according to an existing policy, and a query is initiated to the effective radio frequency fingerprint database for each candidate UE.

2. The effective radio frequency fingerprint database is queried according to identifications of the candidate UEs. If an identification of a certain candidate UE exists in the effective radio frequency fingerprint database and the stability decision result of the candidate UE is a stable state, it is further determined that whether a grid to which the candidate UE belongs has a balanceable inter-frequency neighbor cell, and a correspondence between the candidate UE and the balanceable inter-frequency neighbor cell is fed back to a load balancing function network element.

Decision conditions for the balanceable inter-frequency neighbor cell include the following three points. a. Inter-frequency neighbor cell quality is greater than or equal to LB_Thd1. b. Reporting times of the inter-frequency neighbor cell is greater than or equal to LB_Thd2, and an overlapping coverage degree of the inter-frequency neighbor cell is greater than or equal to LB_Thd3. c. The number of handover attempts of the inter-frequency neighbor cell is greater than or equal to LB_Thd4, and a handover success rate is greater than or equal to LB_Thd5.

Table 1 shows a format of the feedback information.

TABLE 1

| | |
|---|---|
| Candidate UE1, Candidate UE3 | Cell1, Cell4 |
| Candidate UE2 | Cell2, Cell3 |
| Candidate UE 4, Candidate UE5 | No available cell |
| Candidate UE6 | Does not exist in effective radio frequency fingerprint database |
| . . . | . . . |

3. The load balancing function network element performs further cell load decisions on balanceable inter-frequency neighbor cells fed back by the effective radio frequency fingerprint database, and removes the cells whose available load is lower than the threshold.

4. The load balancing function network element performs balance for candidate UEs with balanceable inter-frequency neighboring cells, and a balance mode may be direct blind handover or be based on measurement. A target of the blind handover or measurement takes the balanceable inter-frequency neighbor cell as a guideline.

Embodiment 6

Examples of the creation of the radio frequency fingerprint database and the application of the radio frequency fingerprint database in load balancing are given in Embodiment 5. In this embodiment, the creation of the radio frequency fingerprint database in a radio access (NR) system and the application of radio frequency fingerprint database in the voice fallback LTE are illustrated as examples.

In step 1, data preprocessing is performed.

1. Data of the intra-frequency MR, inter-frequency and inter-system MRs and inter-frequency and inter-system HOs of last N days (e.g., one week) of the serving cell to be optimized is obtained.

2. The intra-frequency MR, inter-frequency MR or inter-system MR reported successively by the user equipment (UE) under a particular condition are associated, and MRs unable to be associated are directly discarded.

3. The data of the associated MRs is screened and ineffective MRs are removed. For example, MRs with "no measurement result of inter-frequency and inter-system neighbor cell" and "no measurement result of intra-frequency neighbor cell, no best beam information of the serving cell, and the serving cell quality being less than a particular threshold" are removed.

4. The MR and the HO are associated, handover execution and results (attempt and success/failure) of handover to the target cell in the HO are merged into the MR associated with the HO for recording.

5. Information of the cell identification, quality, beam identification and handover required for the fingerprint database creation is extracted from the MR, and characteristic quantities related to the cell identification are integrated to obtain an unique cell identification.

In step 2, the initial fingerprint database is generated.

1. Grid construction is performed based on serving cells, at most two intra-frequency neighbor cells with best quality and measurement results (which may include beam-level information in addition to cell-level information) of the at most two intra-frequency neighbor cells as indexes. A format of a grid index is shown in FIG. 15.

2. Inter-frequency and inter-system neighbor cell characteristic statistics are performed at a grid level, that is, inter-frequency and inter-system neighbor cell information statistics in MRs with the same index is performed in the grid corresponding to the index, to obtain the statistical information such as wireless signal characteristics and handover characteristics of the neighbor cell. For example, 1) the number of MRs participating in the grid construction; 2) the neighbor cell quality average value; 3) the number of reporting times of neighbor cell quality being greater than a first threshold; 4) the number of neighbor cell reporting times; and 5) the number of handover attempts and the number of handover successes for the neighbor cell.

In step 3, the effective radio frequency fingerprint database is screened and the base station is synchronized.

1. First, the screening is performed based on statistical significance to remove a grid whose "number of MRs participating in the construction of the grid" is less than a construction threshold from the grid.

2. Neighbor cell effectiveness screening is performed. That is, neighbor cells of which neighbor cell quality, overlapping coverage degrees and handover success rates are respectively greater than each respective corresponding threshold are selected as effective neighbor cells. Grids containing at least one effective neighbor cell as regarded as temporary effective grids, and ineffective grids are removed from the initial radio frequency fingerprint database.

3. It is determined that whether the number of effective neighbor cells/grids exceeds a base station/interface limit value. If the number of effective neighbor cells/grids does not exceed the base station/interface limit value, all the effective neighbor cells/grids are recorded as the effective radio frequency fingerprint database to be transmitted to the base station. If the number of effective neighbor cells/grids exceeds the base station/interface limit value, the screening is carried out according to the following principles, and the screened effective neighbor cells/grids are recorded as the effective radio frequency fingerprint database to be transmitted to the base station.

If the number of the effective grids exceeds the limit, a ratio of the number of effective neighbor cells to the number of all the neighbor cells in the grid is calculated, and grids with higher proportions of effective neighbor cells are preferentially selected.

If the number of effective neighbor cells in the grid exceeds the limit, RSRP of the neighbor cells are normalized first, and then weighting and multiplying are performed on the neighbor cell quality average value, the overlapping coverage degree and the handover success rate of each neighbor cell to obtain the weight of each neighbor cell, and finally neighbor cells with the higher weights are preferentially selected.

In step 4, the base station extends and updates the information of the fingerprint database according to the information reported by UEs in real time.

1. The Uelist in the grid is updated according to the intra-frequency MR reported by a UE.

First, a grid index is generated according to the intra-frequency MR of the UE. Here, assuming that a grid index corresponding to a certain terminal is a grid 1, denoted as grid1. Then, a UE identification and the gird1 are queried in the effective radio frequency fingerprint database.

If the UE identification already exists in the fingerprint database but the grid where the UE located is not the grid1 but a grid2, the UE identification is deleted from the UElist of the grid2 while the UE identification is written to the UElist of the grid1. It is determined that whether effective neighbor cells of the grid1 and effective neighbor cells of the grid2 are the same. If the effective neighbor cells of the grid1 and the effective neighbor cells of the grid2 are the same, it is considered that there is no change between the last two MRs of the UE, and the latest bit of the stability statistics window UeStableWindow is set to 1. If the effective neighbor cells of the grid1 and the effective neighbor cells of the grid2 are different, it is considered that there is a change between the last two MRs of the UE, and the latest bit of the stability statistics window UeStableWindow is set to 0.

If the UE identification does not exist in the fingerprint database and the grid1 exists in the fingerprint database, the UE is written to the UElist of the grid1. Since the UE is written in the UElist of the grid1 for the first time, all bits of UeStableWindow are initially set to 1 and the grid1 is considered to be stable by default.

If the UE identification already exists in the fingerprint database and the grid to which the UE belongs is not changed, it is considered that there is no change between the last two MRs of the UE, and the latest bit of UeStableWindow is set to 1.

Consequently, the base station 120 determines a stable state of the UE according to the UeStableWindow. Assuming that a window length is 5, the base station 120 considers the UE as the stable state and sets UeStableIndicator to be "true" when element bits of UeStableWindow are all 1, i.e., there is no change for 5 consecutive times.

2. When handover and service releasing of a UE occurs, the base station 120 queries the UE identification in the effective radio frequency fingerprint database and deletes the UE identification from the UElist of the grid to which the UE belongs.

3. Information of the grid is updated when the UE reports inter-frequency/inter-system MRs.

The effective radio frequency fingerprint database is queried according to the UE identification. If the UE identification exists in the effective radio frequency fingerprint database, information updating is performed on neighbor cells already reported in the current inter-frequency/inter-system MR and existing in the grid, that is, no new neighbor cell is added.

4. Information of the grid is updated when inter-frequency/inter-system handover of the UE occurs.

The effective radio frequency fingerprint database is queried according to the UE identification. If the UE identification exists in the effective radio frequency fingerprint database and a target cell of the current handover exists in the grid, a handover result (attempt and success/failure) of the current handover is updated to the handover information of the target cell.

In step 5, a voice fallback LTE function is applied to the effective radio frequency fingerprint database.

1. The voice fallback LTE function is triggered and a query is initiated to the effective radio frequency fingerprint database.

2. The effective radio frequency fingerprint database is queried according to an identification of the UE. If the identification of the UE exists in the effective radio frequency fingerprint database and the stability decision result of the UE is a stable state, it is further determined that whether a grid to which the UE belongs has a fall-backable LTE neighbor cell, and information of the LTE neighbor cell is fed back to a voice fallback LTE function network element.

Decision conditions for the fall-backable LTE neighbor cell include the following three points. a. LTE neighbor cell quality is greater than or equal to VFB_Thd1. b. Reporting times of the LTE neighbor cell is greater than or equal to VFB_Thd2, and an overlapping coverage degree of the LTE neighbor cell is greater than or equal to VFB_Thd3. c. The number of handover attempts of LTE neighbor cell is greater than or equal to VFB_Thd4, and a handover success rate is greater than or equal to VFB_Thd5. In some examples, the feedback information may include information indicating the following, i.e., a list of fall-backable cells (e.g., Cell1, Cell2 . . . ).

In other examples, the feedback information may indicate that the UE has no fallback cell, or, the UE does not exist in the effective radio frequency fingerprint database and the effective radio frequency fingerprint database is unable to be applied to implement the voice fallback.

3. The voice fallback LTE function performs further decisions on the fallback LTE neighbor cells fed back by the effective radio frequency fingerprint database, and removes cells whose available load is lower than the threshold or cells not supporting VoLTE.

4. The voice fallback LTE function performs blind handover for the UEs with the fall-backable LTE neighbor cells to ensure a service setup success rate and reduce a service setup delay, thereby improving user experience.

If there are a plurality of fallback LTE neighbor cells, the neighbor cells may be preferentially selected by an effective radio frequency fingerprint database application module or a voice fallback LTE function module.

The method for radio frequency fingerprint database creation and the method for radio frequency fingerprint database application provided in this embodiment reduces the storage pressure and processing pressure on the base station side, enables the radio frequency fingerprint database to play a role in the radio resource management function faster, improves accuracy of statistical information in the grid and availability of the fingerprint database, and shortens the processing delay of the radio frequency fingerprint application.

Those skilled in the art should understand that all or some of the steps in the method, the system, functional modules/units in the apparatus disclosed above may be implemented as software (which may be implemented with program code executable by a computing device), firmware, hardware, and a suitable combination thereof. In a hardware embodiment, partitioning between functional modules/units mentioned in the above description does not necessarily correspond to partitioning of physical components. For example, a physical component may have multiple functions, or a function or step may be performed by several physical components in cooperation. Some or all of physical components may be implemented as software execute by a processor, such as a central processor, digital signal processor or microprocessor, as hardware, or as an integrated circuit such as an application-specific integrated circuit. Such software may be distributed on a computer-readable medium and executed by a computing device, and in some cases, the steps shown or described may be performed in a sequence different from that described herein, the computer-readable medium may include a computer storage medium (or non-transitory medium) and a communication medium (or transitory medium). As is well known to those of ordinary skills in the art, the term "computer storage medium" includes volatile and non-volatile, removable and non-removable media implemented in any method or technique for storing information, such as computer-readable instructions, data structures, program modules or other data. Computer storage media include, but are not limited to, random access memory (RAM), read-only memory (ROM), electrically erasable programmable read-only memory (EEPROM), flash memory or other memory technologies, compact disc read-only memory (CD-ROM), a digital versatile disk or other optical disk storage, a magnetic cassette, a magnetic tape, magnetic disk storage or other magnetic storage devices, or any other medium able to be used to store desired information and able to be accessed by a computer. Furthermore, as is well known to those of ordinary skills in the art, a communication medium typically contains computer-readable instructions, data structures, program modules, or other data in signals such as a carrier wave or modulated data signals in other transmission mechanism, and may include any information delivery medium. Therefore, the present disclosure is not limited to any specific combination of hardware and software.

The above contents are further detailed descriptions of the embodiments of the present disclosure with reference to specific embodiments, and the specific implementation of the present disclosure should not be deemed to be limited to these descriptions. For a person of ordinary skills in the art, a number of simple deductions or substitutions may be made without departing from the concept of the present disclosure, which shall be deemed to fall within the protection scope of the present disclosure.

What is claimed is:

1. A method for radio frequency fingerprint database creation, comprising:
dividing a cell logically into a plurality of grids according to a plurality of grid indexes and historical data reported by each of a plurality of terminals in the cell, wherein one grid index is used to uniquely identify one grid;
performing neighbor cell information statistics on each of a plurality of neighbor cells of the cell in each of the plurality of grids; and
generating an effective radio frequency fingerprint database corresponding to the cell according to a result of the dividing and a result of the neighbor cell information statistics;
wherein each of the plurality of grid indexes comprises a serving cell identification and serving cell quality.

2. The method for radio frequency fingerprint database creation according to claim 1, wherein each of the plurality of grid indexes further comprises:
a strongest intra-frequency neighbor cell identification and strongest intra-frequency neighbor cell quality.

3. The method for radio frequency fingerprint database creation according to claim 1, wherein the historical data comprises a measurement report MR and handover HO information reported by a terminal within a preset period of time from a current time; or, the historical data comprises a preset number of MRs and the HO information recently reported by the terminal.

4. The method for radio frequency fingerprint database creation according to claim 3, wherein the MR comprises one or both of an inter-frequency MR and an inter-system MR, and an intra-frequency MR.

5. The method for radio frequency fingerprint database creation according to claim 3, wherein the HO information comprises one or both of an inter-frequency HO and an inter-system HO.

6. The method for radio frequency fingerprint database creation according to claim 1, wherein dividing the cell into the plurality of grids according to the plurality of grid indexes and historical data reported by each of the plurality of terminals in the cell comprises:
performing association filling processing on the historical data reported by each of the plurality of terminals in the cell;
dividing the cell into the plurality of grids according to the plurality of grid indexes and the historical data after the association filling processing.

7. The method for radio frequency fingerprint database creation according to claim 6, wherein the historical data comprises an intra-frequency MR, an inter-frequency MR, an inter-system MR, an inter-frequency HO and an inter-system HO, each of the plurality of grids comprises information of M intra-frequency neighbor cells, and performing association filling processing on the historical data reported by each of the plurality of terminals in the cell comprises:
for each terminal of the plurality of terminals, associating the intra-frequency MR, the inter-frequency MR, the inter-system MR, the inter-frequency HO and the inter-system HO successively reported by the each terminal to obtain the historical data of the each terminal; and
for history data in which a number of intra-frequency neighbor cells is less than M, filling the history data to obtain the history data after the association filling processing, wherein M is a positive integer.

8. The method for radio frequency fingerprint database creation according to claim 1, wherein generating the effective radio frequency fingerprint database corresponding to the cell according to the result of the dividing and the result of the neighbor cell information statistics comprises:
generating an initial radio frequency fingerprint database according to the result of the dividing and the result of the neighbor cell information statistics; and
screening grids in the initial radio frequency fingerprint database to determine the effective radio frequency fingerprint database.

9. The method for radio frequency fingerprint database creation according to claim 8, wherein screening the grids in the initial radio frequency fingerprint database to determine the effective radio frequency fingerprint database comprises:
removing grids whose number of MRs participating in grid construction is less than a construction threshold in the initial radio frequency fingerprint database;
removing neighbor cells whose number of neighbor cell reporting times is less than a reporting threshold in the initial radio frequency fingerprint database;
selecting neighbor cells of which neighbor cell quality average values, overlapping coverage degrees and handover success rates are respectively greater than each respective corresponding threshold as effective neighbor cells, and using grids containing at least one effective neighbor cell as temporary effective grids;
in response to a number of the temporary effective grids not exceeding an effective grid threshold, taking all the temporary effective grids as effective grids; and
in response to a number of neighbor cells contained in each of the effective grids not exceeding a neighbor cell threshold, creating the effective radio frequency fingerprint database based on the effective grids.

10. The method for radio frequency fingerprint database creation according to claim 9, wherein in response to the number of the temporary effective grids exceeding the effective grid threshold, the temporary effective grids having higher ratios of a number of effective neighbor cells to a number of total neighbor cells is preferentially selected as the effective grids.

11. The method for radio frequency fingerprint database creation according to claim 9, wherein in response to the number of neighbor cells contained in each of the effective grids exceeding the neighbor cell threshold, neighbor cells having higher neighbor cell weights in each of the effective grids are preferentially reserved, and remaining neighbor cells are screened out; and wherein each of the neighbor cell weights is obtained by normalizing a neighbor cell quality average value of a neighbor cell in each of the effective grids and then respectively multiplying the neighbor cell quality average value, an overlapping coverage degree and a handover success rate of the neighbor cell by each respective corresponding weight.

12. The method for radio frequency fingerprint database creation according to claim 1, wherein the neighbor cell information counted for a certain neighbor cell under a grid represents at least one of neighbor cell quality of the certain neighbor cell measured in the grid, an overlapping coverage degree of the certain neighbor cell in the grid, and a handover success rate of handover of a terminal to the certain neighbor cell in the grid.

13. The method for radio frequency fingerprint database creation according to claim 12, wherein before performing the neighbor cell information statistics on each of the plurality of neighbor cells of the cell in each of the plurality of grids, the method further comprises:
counting a number of MRs participating in grid construction for each of the plurality of grids; and
for each neighbor cell of the plurality of neighbor cells of the cell, counting the following in each of the plurality of grids:
the neighbor cell quality average value;
a number of reporting times of neighbor cell quality being greater than a first threshold;
a number of neighbor cell reporting times; and
a number of handover attempts and a number of handover successes for the each neighbor cell;
wherein the neighbor cell quality is represented by the neighbor cell quality average value, the overlapping coverage degree is represented by a ratio of the number of the reporting times of the neighbor cell quality being greater than the first threshold to the number of MRs, and the handover success rate is represented by a ratio of the number of handover successes to the number of handover attempts.

14. A method for radio frequency fingerprint database application, comprising:
acquiring an effective radio frequency fingerprint database created by a centralized processing device, wherein the effective radio frequency fingerprint database is created according to a method for radio frequency fingerprint database creation; and
applying the effective radio frequency fingerprint database to perform radio resource management RRM on a plurality of terminals;
wherein the method for radio frequency fingerprint database creation comprises:
dividing a cell logically into a plurality of grids according to a plurality of grid indexes and historical data reported by each of a plurality of terminals in the cell, wherein one grid index is used to uniquely identify one grid;

performing neighbor cell information statistics on each of a plurality of neighbor cells of the cell in each of the plurality of grids; and generating an effective radio frequency fingerprint database corresponding to the cell according to a result of the dividing and a result of the neighbor cell information statistics;

wherein each of the plurality of grid indexes comprises a serving cell identification and serving cell quality.

15. The method for radio frequency fingerprint database application according to claim 14, wherein applying the effective radio frequency fingerprint database to perform radio resource management RRM on the plurality of terminals comprises:

determining that a grid to which a terminal belongs is stable when the RRM needs to be performed on the terminal; and applying the effective radio frequency fingerprint database to perform the RRM on the terminal.

16. The method for radio frequency fingerprint database application according to claim 15, wherein determining that the grid to which the terminal belongs is stable comprises:

in response to determining that last N stability decisions of the grid to which the terminal belongs are all temporarily stable, determining that the grid to which the terminal belongs is stable, wherein a value of N is a positive integer greater than or equal to 2;

in a stability decision, in response to that grids to which the terminal belongs in intra-frequency measurement reports MRs respectively reported by the terminal at this time and at previous time are the same, or that the grids to which the terminal belongs in intra-frequency measurement reports MRs respectively reported by the terminal at this time and at previous time are different but effective neighbor cells to which the terminal belongs in intra-frequency measurement reports MRs respectively reported by the terminal at this time and at previous time are the same, determining that the grid to which the terminal belongs is temporarily stable.

17. The method for radio frequency fingerprint database application according to claim 14, wherein the effective radio frequency fingerprint database comprises a terminal list uniquely corresponding to a plurality of grids, and the terminal list records unique identification information of each of the plurality of terminals in the plurality of grids.

18. The method for radio frequency fingerprint database application according to claim 14, further comprising:

updating the following information of the grid to which the terminal belongs according to MR and handover HO information reported by the terminal in real time:

a number of MRs participating in grid construction;

a neighbor cell quality average value;

a number of reporting times of neighbor cell quality being greater than a first threshold;

a number of neighbor cell reporting times; and a number of handover attempts and a number of handover successes for a neighbor cell.

19. A centralized processing device, comprising: a first processor, a first memory and a first communication bus; wherein:

the first communication bus is configured to realize communication connection between the first processor and the first memory; and the first processor is configured to execute one or more programs stored in the first memory to perform steps in a method for radio frequency fingerprint database creation;

wherein the method for radio frequency fingerprint database creation comprises:

dividing a cell logically into a plurality of grids according to a plurality of grid indexes and historical data reported by each of a plurality of terminals in the cell, wherein one grid index is used to uniquely identify one grid, and each of the plurality of grid indexes comprises a serving cell identification and serving cell quality;

performing neighbor cell information statistics on each of a plurality of neighbor cells of the cell in each of the plurality of grids; and generating an effective radio frequency fingerprint database corresponding to the cell according to a result of the dividing and a result of the neighbor cell information statistics.

20. The centralized processing device according to claim 19, wherein each of the plurality of grid indexes further comprises: a strongest intra-frequency neighbor cell identification and strongest intra-frequency neighbor cell quality.

\* \* \* \* \*